(12) United States Patent
Zhu et al.

(10) Patent No.: US 11,703,433 B2
(45) Date of Patent: Jul. 18, 2023

(54) DYNAMIC TRUE TRIAXIAL ELECTROMAGNETIC HOPKINSON BAR SYSTEM AND TESTING METHOD

(71) Applicant: SHENZHEN UNIVERSITY., Shenzhen (CN)

(72) Inventors: Jianbo Zhu, Shenzhen (CN); Heping Xie, Shenzhen (CN); Tao Zhou, Shenzhen (CN); Jian Zhao, Shenzhen (SG); Yulong Li, Xian (CN); Tao Suo, Xian (CN); Zhongbin Tang, Xian (CN); Zhiyi Liao, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 271 days.

(21) Appl. No.: 17/359,260

(22) Filed: Jun. 25, 2021

(65) Prior Publication Data

US 2021/0318216 A1    Oct. 14, 2021

Related U.S. Application Data

(63) Continuation of application No. PCT/CN2019/115477, filed on Nov. 5, 2019, and a
(Continued)

(30) Foreign Application Priority Data

Dec. 26, 2018 (CN) .......................... 201811601112.7
Dec. 26, 2018 (CN) .......................... 201811602351.4
Dec. 26, 2018 (CN) .......................... 201811602413.1

(51) Int. Cl.
*G01N 3/36* (2006.01)

(52) U.S. Cl.
CPC ....... *G01N 3/36* (2013.01); *G01N 2203/0048* (2013.01); *G01N 2203/0256* (2013.01)

(58) Field of Classification Search
CPC ............ G01N 3/36; G01N 2203/0048; G01N 2203/0256; G01N 3/307; G01N 2203/0083; G01N 2203/0098
See application file for complete search history.

(56) References Cited

U.S. PATENT DOCUMENTS 10,324,014 B2 *   6/2019  Feng ...................... G01N 3/307
10,345,269 B2 *   7/2019  Lee ....................... G01N 29/043
(Continued)

FOREIGN PATENT DOCUMENTS

CN    101769837 A    7/2010
CN    101852705 A    10/2010
(Continued)

OTHER PUBLICATIONS

The World Intellectual Property Organization (WIPO) International Search Report for PCT/CN2019/115477 dated Jan. 23, 2020 3 Pages (including translation).
(Continued)

*Primary Examiner* — Freddie Kirkland, III
(74) *Attorney, Agent, or Firm* — Anova Law Group, PLLC

(57) ABSTRACT

The present disclosure provides a dynamic true triaxial electromagnetic Hopkinson bar system and testing method, the method including: firstly, before applying a static prestress and an impact load, recording and storing complete ultrasonic signals in the directions X, Y, and Z without application of the static prestress and the impact load; secondly, applying the static prestress; thirdly, recording and storing complete ultrasonic signals in the directions X, Y, and Z under the static prestress; fourthly, applying the impact load, and utilizing an triaxial and six-directional synchronous-coordinated-control electromagnetic loading system to apply a dynamic impact load to a test specimen; and fifthly, after completing the dynamic impact loading
(Continued)

test, recording and storing once again complete ultrasonic signals in the directions X, Y, and Z without releasing the static prestress after application of the static prestress and the dynamic impact load.

18 Claims, 13 Drawing Sheets

Related U.S. Application Data continuation of application No. PCT/CN2019/115483, filed on Nov. 5, 2019, and a continuation of application No. PCT/CN2019/115478, filed on Nov. 5, 2019.

(56) References Cited

U.S. PATENT DOCUMENTS

| | | | |
|---|---|---|---|
| 10,365,193 | B2* | 7/2019 | Feng .................. G01N 3/12 |
| 10,481,057 | B1 | 11/2019 | Song et al. |
| 11,119,018 | B2* | 9/2021 | Feng .................. G01N 3/12 |
| 2018/0045683 | A1* | 2/2018 | Lee ................. G01N 29/2443 |
| 2018/0275034 | A1* | 9/2018 | Feng .................. G01N 3/307 |
| 2021/0325287 | A1* | 10/2021 | Xie .................... G01N 3/08 |
| 2022/0196527 | A1* | 6/2022 | Liu ................... G01N 33/24 |

FOREIGN PATENT DOCUMENTS

| | | |
|---|---|---|
| CN | 202101910 U | 1/2012 |
| CN | 104535409 A | 4/2015 |
| CN | 204405454 U | 6/2015 |
| CN | 104949880 A | 9/2015 |
| CN | 104990777 A | 10/2015 |
| CN | 105571961 A | 5/2016 |
| CN | 205719826 U | 11/2016 |
| CN | 106198227 A | 12/2016 |
| CN | 106248475 A | 12/2016 |
| CN | 107014690 A | 8/2017 |
| CN | 108152155 A | 6/2018 |
| CN | 108548942 A | 9/2018 |
| CN | 109406311 A | 3/2019 |
| CN | 109406312 A | 3/2019 |
| CN | 109406313 A | 3/2019 |
| GB | 2534679 A | 8/2016 |
| KR | 101727405 B1 | 5/2017 |
| WO | 9833053 A1 | 7/1998 |

OTHER PUBLICATIONS

The World Intellectual Property Organization (WIPO) International Search Report for PCT/CN2019/115478 dated Jan. 23, 2020 3 Pages (including translation).

The World Intellectual Property Organization (WIPO) International Search Report for PCT/CN2019/115483 dated Jan. 23, 2020 3 Pages (including translation).

Hailiang Nie et al., "«Data Processing Method for Bidirectional-load Split Hopkinson Compression Bar»","«Explosion and Shock Waves»", May 31, 2018 (May 31, 2018), p. 517, paragraph 1 to p. 518, paragraph1, and figure 1.

Zhan-wei Liu et al., "On the Mini-SHPB Device Based on Multi-Level Electromagnetic Emissions", "Journal of Experimental Mechanics", vol. 28, No. 5, Oct. 2013, pp. 557-562.

Wei-Guo Guo et al., "Electromagnetic Driving Technique Applied to Split-Hopkinson Pressure Bar Device", "Journal of Experimental Mechanics", vol. 25, No. 6, Dec. 2010, pp. 682-689.

Lei Zhang et al., "On the Dynamic Compression-shear Characteristics of Cement Mortar Joint Surface based on a Bunched Bar System", "Journal of Experimental Mechanics", vol. 31, No. 2, Apr. 2016, pp. 175-185.

C. Albertini et al., "Impact Fracture Process and Mechanical Properties of Plain Concrete by Means of an Hopkinson Bar Bundle", "Journal de Physique IV Colloque", pp. C3-914-C3-920, 1997.

\* cited by examiner

DYNAMIC TRUE TRIAXIAL ELECTROMAGNETIC HOPKINSON BAR SYSTEM AND TESTING METHOD

CROSS-REFERENCES TO RELATED APPLICATIONS

This application is a Bypass Continuation Application of PCT Patent Application No. PCT/CN2019/115477, filed on Nov. 5, 2019, which claims priority to Chinese Patent Application No. 201811602413.1, filed on Dec. 26, 2018. This application is also a continuation application of PCT Patent Application No. PCT/CN2019/115478, filed on Nov. 5, 2019, which claims priority to Chinese Patent Application No. 201811601112.7, filed on Dec. 26, 2018. This application is also a continuation application of PCT Patent Application No. PCT/CN2019/115483, filed on Nov. 5, 2019, which claims priority to Chinese Patent Application No. 201811602351.4, filed on Dec. 26, 2018. The content of all aforesaid applications is incorporated herein by reference.

TECHNICAL FIELD

The present disclosure relates to the test of dynamic mechanical properties of solid materials such as rock, concrete, polymer and the like, and more particularly to the test and research on mechanical properties and failure characteristics of materials of large dimension under a dynamic-static combined loading condition, and the research on the dynamic damage evolution of solid materials such as rock, concrete, polymer and the like under a dynamic-static combined loading condition based on a dynamic true triaxial electromagnetic Hopkinson bar system, and their influence on propagation and attenuation laws of ultrasonic waves and stress waves.

BACKGROUND

At present, both here and abroad, the researches on dynamic properties of the materials such as rock and concrete loaded with impact mainly rely on the Hopkinson bar apparatus. The existing Hopkinson bar apparatuses include one-dimensional Hopkinson bar, conventional triaxial Hopkinson bar, unidirectional impact loaded static true triaxial confining pressure Hopkinson bar, and one-dimensional Hopkinson square bar.

The existing Hopkinson bar apparatuses for testing impact property of materials such as rock and concrete both here and abroad have a strict requirement for the size of a test specimen. Generally, the diameter and length of the test specimen are both less than 50 mm. Therefore, the existing Hopkinson bar apparatuses cannot be applied to study the dynamic properties of a larger (for example, diameter ≥100 mm) specimen under impact loading condition, cannot consider the real time influence of temperature on rock specimen, and particularly cannot consider the case of real-time temperature and pressure coupled loading. In fact, as heterogeneous materials, the dynamic responses of rock and concrete have obvious anisotropy and a heterogeneous deformation characteristic. During test, the existing Hopkinson bar apparatuses use a small (generally, specimen diameter ≤50 mm) test specimen, the dynamic responses of the test specimen is considered to be isotropic and homogeneous, and therefore cannot truly reflect the real dynamic responses of the materials such as rock, concrete and the like. In addition, the existing Hopkinson bar apparatuses in the prior art can only conduct one-dimensional impact or one-dimensional impact with static confining pressure experiments study the dynamic properties of materials such as rock and concrete. However, in practical engineering, the materials such as rock and concrete not only bear a single direction impact load, but also are under the action of biaxial or triaxial and six-directional impact loads. The existing apparatuses in the prior art cannot implement dynamic impact test research under such condition, and likewise cannot study the dynamic damage evolution of solid materials such as rock and concrete loaded with dynamic and static loads, and their influence on ultrasonic wave propagation and attenuation rule.

SUMMARY

In order to improve the test accuracy of dynamic mechanical properties of the materials such as rock and concrete under impact loading, and to obtain the dynamic stress-strain response feature of different parts of a test specimen during impact loading, so as to study the dynamic damage anisotropy feature and damage law of the materials such as rock and concrete under a true triaxial dynamic-static combined loading condition, and in order to fill the gap that a temperature-pressure coupling test cannot be performed on the materials such as rock and concrete, under dynamic impact loading, especially the true triaxial dynamic-static combined impacts, and to overcome the defects that the existing method for testing the dynamic properties of the solid materials such as rock and concrete based on the Hopkinson bar cannot investigate dynamic damage evolution of the material and its influence on ultrasonic wave propagation and attenuation with in situ pressure retaining state, the present disclosure provides a dynamic true triaxial electromagnetic Hopkinson bar system and testing method.

The present disclosure provides a dynamic true triaxial electromagnetic Hopkinson bar system, including a horizontal cruciform support platform, a central cubic box, a square bar, and a square bar fixation and support frame, wherein the horizontal cruciform support platform includes a support platform in the direction $X_+$, a support platform in the direction $X_-$, a support platform in the direction $Y_+$, a support platform in the direction $Y_-$, and a central support platform; an upper surface of the central cubic box completely opens; the direction of the upper surface of the central cubic box is the direction $Z_+$; a square opening is disposed in the center of the central cubic box in each direction of $X_+$, $X_-$, $Y_+$, $Y_-$, and $Z_-$, respectively; the size of the square openings is the same as that of the square bars; the central cubic box is disposed in the center of an upper surface of the central support platform; the central cubic box and the horizontal cruciform support platform form an orthogonal coordinate system; confining-pressure loading systems, electromagnetic pulse generators, the square bars, and self-lubricating square bar fixation and support frames in the directions $X_+$, $X_-$, $Y_+$, $Y_-$, $Z_+$, and $Z_-$ are respectively symmetrically arranged by taking the central cubic box as a symmetric center, so as to construct the dynamic true triaxial electromagnetic Hopkinson bar system. The square bars in the directions $X_+$, $X_-$, $Y_+$, $Y_-$, $Z_+$, and $Z_-$ in the dynamic true triaxial electromagnetic Hopkinson bar system are fixed by the self-lubricating square bar fixation and support frames; the square bars and the central cubic box are centered and connected at the square openings; In the confining-pressure loading system, the confining-pressure loading hydraulic cylinder, the confining-pressure loading actuator, and the confining-pressure loading frame are combined in series;

and the confining-pressure loading frame is connected to the circular bulge in series, and is used to transfer the pressure from the confining-pressure loading hydraulic cylinder to the square bars and the test specimen.

Further, the dynamic true triaxial electromagnetic Hopkinson bar system of the present disclosure further includes a temperature control system, wherein the temperature control system includes a temperature control apparatus; the temperature control apparatus includes a temperature control cabinet; heating holes are built in the temperature control cabinet; heating rods with lead wires are placed in the heating holes; the volume of a hearth of the temperature control cabinet is 1.5-2.5 times that of the test specimen; a square hole is respectively reserved on each surface of the temperature control cabinet; the size of the square holes on the six surfaces of the temperature control cabinet is consistent with the size of the cross section of the square bar of the Hopkinson bar; and the temperature control cabinet is designed to have four symmetric parts. The temperature control system can be used to conduct experimental research in different temperature fields on the basis of the dynamic true triaxial electromagnetic Hopkinson bar system.

Further, the square bar loading system of the dynamic true triaxial electromagnetic Hopkinson bar system of the present disclosure consists of small (side length of the cross section ≤50 mm) square bars, square bar fixation and support frames, and strain monitoring elements. The small square bars in the directions X and Y are horizontally placed, and the small square bars in the direction Z are vertically placed; the single bars are orderly and symmetrically bounded by the square bar fixation and support frames to form large (side length of the cross section≥100 mm) square bars; a 1 mm-2 mm gap is reserved between the single bars, facilitating the adhesion of resistance strain gauges on each single bar and the connection of the lead wires, and ensuring that a stress wave can propagate in parallel in the small square bars with no interference to each other. The cross sections and lengths of the square bars in all directions in the triaxial and six-directional square bar system are all equal, and the internal dynamic stress wave propagation behavior and monitoring of the dynamic response signal in the square bars are all the same. By taking an uni-axial and bidirectional square bar system in the direction X as an example, the small single bars of the square bar in the direction $X_+$ and the corresponding small single bars of the square bar in the direction $X_-$ respectively form a pair of Hopkinson bar which satisfies one-dimensional stress wave propagation condition $(\varepsilon_{i\_x_+}+\varepsilon_{r\_x_+}=\varepsilon_{i\_x_-}+\varepsilon_{r\_x_-})$ wherein $\varepsilon_{i\_x_+}$ and $\varepsilon_{i\_x_-}$ denote incident waves in the small single bars in the directions $X_+$ and $X_-$, respectively; $\varepsilon_{r\_x_+}$ and $\varepsilon_{r\_x_-}$ denote reflected waves in the small single bars in the directions $X_+$ and $X_-$, respectively; the incident wave in the direction $X_+$ is reflected by the interface between the bar and the test specimen to form a reflected wave (which returns to the bar in the direction $X_+$); the incident wave in the direction $X_-$ passes through the test specimen, and is then transmitted to the bar in the direction $X_+$ to form a transmitted wave; and the reflected wave in the direction $X_+$ and the transmitted wave in the direction $X_+$ are superposed to form $\varepsilon_{r\_x_+}$; similarly, the incident wave in the direction $X_-$ is reflected by the interface between the bar and the test specimen to form a reflected wave (which returns to the bar in the direction $X_-$); the incident wave in the direction $X_+$ passes through the test specimen, and is then transmitted to the bar in the direction $X_-$ to form a transmitted wave; and the reflected wave in the direction $X_-$ and the transmitted wave in the direction $X_-$ are superposed to form $\varepsilon_{r\_x_-}$. The square bars in the directions $X_+$ and $X_-$ respectively consist of a bundle of small single bars with the same cross section; during testing, each small single bar is attached with strain gauges which are used to measure the incident wave signal, reflected wave signal, and transmitted wave signal in the single bar. On the basis of one-dimensional stress wave propagation theory, according to strain gauge signal on each single bar recorded by a multi-channel precise synchronous data monitoring, acquisition, and observation system, the incident strain-time curve, the reflected strain-time curve, and the transmitted strain-time curve of each small single bar can be calculated, and thereby can obtain the local dynamic stress-strain responses of the test rock or concrete specimen at positions corresponding to the small single bars. On such basis, an average stress and an average strain of the test specimen can be further obtained by means of relevant theories, and the overall dynamic mechanical properties of heterogeneous materials such as rock and concrete at different impact strain rates can be investigated.

In another aspect, the present disclosure discloses a method for using the dynamic true triaxial electromagnetic Hopkinson bar system to implement dynamic damage of solid material and ultrasonic wave propagation tests. The method includes: step 1, before a static prestress and an impact load are applied, placing an ultrasonic probe at an incident end of each square bar in six directions, wherein the square bar is a square single bar; in the direction $X_+$, the ultrasonic probe is an ultrasonic transmitter probe which emits an ultrasonic incident signal, wherein the ultrasonic signal propagates along the square bar in the direction $X_+$, passes through the cubic test specimen, and then continuously propagates to the square bar as the transmitted ultrasonic signal in the direction $X_-$, which is finally received by an ultrasonic receiver probe placed at the incident end of the square bar in the direction $X_-$; recording and storing a complete ultrasonic signal in the direction X without application of the static prestress and the impact load; in the direction Y, utilizing an ultrasonic transmitter probe placed at the incident end of the square bar in the direction $Y_+$ to emit an ultrasonic incident signal, wherein the ultrasonic signal propagates along the square bar in the direction $Y_+$, passes through the cubic test specimen, and then continuously propagates to the square bar in the direction $Y_-$ as the transmitted ultrasonic signal, which is finally received by an ultrasonic receiver probe placed at the incident end of the square bar in the direction $Y_-$; recording and storing a complete ultrasonic signal in the direction Y without application of the static prestress and the impact load; in the direction Z, utilizing an ultrasonic transmitter probe placed at the incident end of the square bar in the direction $Z_+$ to emit an ultrasonic incident signal, wherein the ultrasonic signal propagates along the square bar in the direction $Z_+$, passes through the cubic test specimen, and then continuously propagates to the square bar in the direction $Z_-$ as the transmitted ultrasonic signal, which is finally received by an ultrasonic receiver probe at the incident end of the square bar in the direction $Z_-$; recording and storing a complete ultrasonic signal in the direction Z without application of the static prestress and the impact load;

step 2, applying the static prestress, wherein a mode of applying the static prestress is provided by taking the direction X as an example: opening a high pressure oil pipe, filling a confining-pressure loading hydraulic cylinder in the direction $X_+$ with oil by means of an oil inlet, and pushing a confining-pressure loading actuator in the direction $X_+$ to move forward and contact a confining-pressure loading frame in the direction $X_+$; continuously applying an oil pressure to push the confining-pressure loading actuator in the direction $X_+$ to move forward and then transfers an axial pressure to the square bar in the direction $X_+$ by means of a circular bulge in the direction $X_+$, and then loading the axial pressure on the cubic test specimen, so that the cubic test specimen is under a precise static prestress in the direction X; similarly, the static confining-pressure loading principle in the directions Y and Z is the same as that in the direction X;

step 3, under the action of the static prestress in the step 2, re-utilizing the ultrasonic transmitter probe at the incident end of the square bar in the direction $X_+$ to emit an ultrasonic incident signal, and utilizing the ultrasonic receiver probe at the incident end of the square bar in the direction $X_-$ to receive the transmitted ultrasonic signal passing through the test specimen loaded with static prestress, recording and storing a complete ultrasonic signal in the direction X under the static prestress; in the direction Y, utilizing the ultrasonic transmitter probe at the incident end of the square bar in the direction $Y_+$ to emit an ultrasonic incident signal, and utilizing the ultrasonic receiver probe at the incident end of the square bar in the direction $Y_-$ to receive the transmitted ultrasonic signal passing through the test specimen loaded with static prestress, recording and storing a complete ultrasonic signal in the direction Y under the static prestress; in the direction Z, utilizing the ultrasonic transmitter probe at the incident end of the square bar in the direction $Z_+$ to emit an ultrasonic incident signal, utilizing the ultrasonic receiver probe at the incident end of the square bar in the direction $Z_-$ to receive the transmitted ultrasonic signal passing through the test specimen loaded with static prestress, recording and storing a complete ultrasonic signal in the direction Z under the static prestress;

step 4, applying the impact load, wherein a mode of applying the impact load is provided by taking the direction X as an example: after completing the step 3, moving the ultrasonic transmitter probe and the ultrasonic receiver probe closely attached to the incident end of the square bars in the directions $X_+$ and $X_-$ respectively, then, placing an electromagnetic pulse generator in the direction $X_+$ and an electromagnetic pulse generator support frame in the direction $X_+$ at the incident end of the square bar in the direction $X_+$ in the confining-pressure loading frame in the direction $X_+$, wherein the electromagnetic pulse generator in the direction $X_+$ is freely and closely attached to the incident end of the square bar in the direction $X_+$, and is used to apply a dynamic stress pulse load in the direction $X_+$ to the test specimen along the incident end of the square bar in the direction $X_+$; and placing an electromagnetic pulse generator in the direction $X_-$ and an electromagnetic pulse generator support frame in the direction $X_-$ at the incident end of the square bar in the direction $X_-$ in the confining-pressure loading frame in the direction $X_-$, wherein the electromagnetic pulse generator in the direction $X_-$ is freely and closely attached to the incident end of the square bar in the direction $X_-$, and is used to apply a dynamic stress pulse load in the direction $X_-$ to the test specimen along the incident end of the square bar in the direction $X_-$; similarly, after performing the same operations as those in the direction X in the directions Y and Z, then utilizing the triaxial and six-directional synchronous-coordinated-control electromagnetic loading system to apply dynamic impact loads to the test specimen along the directions X, Y and Z;

step 5, after completing the dynamic impact loading test, continuously remaining the static prestress in the directions X, Y, and Z unchanged, namely, not releasing the static prestress, then removing the electromagnetic pulse generator in the direction $X_+$ and the electromagnetic pulse generator support frame in the direction $X_+$, and placing the ultrasonic transmitter probe at the incident end of the square bar in the direction $X_+$ in the confining-pressure loading frame in the direction $X_+$, wherein the ultrasonic transmitter probe is freely and closely attached to the incident end of the square bar in the direction $X_+$; similarly, after performing the same operations as those in the direction $X_+$ in the directions $X_-$, $Y_+$, $Y_-$, $Z_+$, and $Z_-$, all the electromagnetic pulse generators and the electromagnetic pulse generator support frames are removed away, and enabling the ultrasonic transmitter probes and the ultrasonic receiver probes to be freely and closely attached to the incident ends of the square bars; subsequently, under the state that the static prestress is not released, utilizing the ultrasonic transmitter probe at the incident end of the square bar in the direction $X_+$ to emit an ultrasonic incident signal, utilizing the ultrasonic receiver probe at the incident end of the square bar in the direction $X_-$ to receive the transmitted ultrasonic signal passing through the impact loaded test specimen from the direction X, recording and storing a complete ultrasonic signal in the direction X after application of the static prestress and the dynamic impact load, respectively; in the direction Y, utilizing the ultrasonic transmitter probe at the incident end of the square bar in the direction $Y_+$ to emit an ultrasonic incident signal, utilizing the ultrasonic receiver probe at the incident end of the square bar in the direction $Y_-$ to receive the transmitted ultrasonic signal passing through the impact loaded test specimen from the direction Y, recording and storing a complete ultrasonic signal in the direction Y after application of the static prestress and the dynamic impact load, respectively; in the direction Z, utilizing the ultrasonic transmitter probe at the incident end of the square bar in the direction $Z_+$ to emit an ultrasonic incident signal, utilizing the ultrasonic receiver probe at the incident end of the square bar in the direction $Z_-$ to receive the transmitted ultrasonic signal passing through the impact loaded test specimen from the direction Z, recording and storing a complete ultrasonic signal in the direction Z after application of the static prestress and the dynamic impact load, respectively;

As a further improvement of the present disclosure, the distance from the circular bulge to a loading end of an incident stress wave of the square bar is 3%-7% of the length of the square bar.

As a further improvement of the present disclosure, the length of the circular bulge is 1.5%-4% of the length of the square bar.

As a further improvement of the present disclosure, the diameter of the circular bulge is 1.5-2.5 times the side length of a cross section of the square bar.

As a further improvement of the present disclosure, in the step 2, the static prestresses are synchronously controlled and loaded in the directions X, Y, and Z by means of a servo controlled static confining-pressure loading system, and the load amplitudes of the static confining pressures can be flexibly set in the directions X, Y, and Z according to test requirements.

As a further improvement of the present disclosure, in the step 4, the dynamic impact loads are synchronously or asynchronous controlled and loaded in the directions X, Y, and Z by means of the triaxial and six-directional synchronous-coordinated-control electromagnetic loading system, and the load amplitudes of the dynamic impact loads can be flexibly set in the directions X, Y, and Z according to test requirements.

As a further improvement of the present disclosure, the static confining pressure in the direction $X_+$ and the static confining pressure in the direction $X_-$ are an action and a reaction which are equal in magnitude and opposite in direction; the static confining pressure in the direction $Y_+$ and the static confining pressure in the direction $Y_-$ are an action and a reaction which are equal in magnitude and opposite in direction; and the static confining pressure in the direction $Z_+$ and the static confining pressure in the direction $Z_-$ are an action and a reaction which are equal in magnitude and opposite in direction.

In another aspect, the present disclosure further discloses a method for utilizing the dynamic true triaxial electromagnetic Hopkinson bar system with large-size square bars to study the dynamic properties of test specimen with large dimension.

The beneficial effects of the present disclosure are:

(1) The dynamic true triaxial electromagnetic Hopkinson bar system can carry out three-dimensional impact tests on large dimensional materials such as rock, concrete and the like in a true triaxial static prestress state, thereby enabling a test result to have more practical engineering meaning.

(2) The large-size square bar is formed by a bundle of small bars; the large-size square bar not only can implement the dynamic impact test on a large dimensional test specimen such as rock and concrete, but also can eliminate dispersion effect and inertia effect of a single large-size square bar during stress wave propagation, and can measure stress-strain feature of different parts of the test specimen.

(3) The present disclosure overcomes the defect that the existing Hopkinson bar cannot test the dynamic properties of large dimensional materials such as rock, concrete and the like, and makes up the shortcoming that the existing Hopkinson bar test cannot effectively obtain a local dynamic stress-strain response feature of the test specimen.

(4) The present disclosure realizes, for the first time, the test of damage evolution of solid materials such as rock, concrete and the like with in situ pressure retaining state under dynamic impact, and their influences on ultrasonic wave propagation speed, attenuation laws of ultrasonic wave amplitude, frequency spectrum and the like. The configuration of the circular bulge can ensure that the incident end of the Hopkinson square bar is a free end after a static prestress (confining pressure) is applied to the test specimen; the present disclosure solves the problem that the conventional dynamic-static combined loading Hopkinson bar system cannot ensure the ends of a Hopkinson incident bar and a transmission bar are in free state after a static prestress is applied, thereby providing a test condition for applying an electromagnetically excited stress pulse (dynamic pulse load) and performing ultrasonic tests with in situ pressure retaining state.

(5) The test specimen can be heated in in-situ condition and maintained at a constant temperature; therefore, a researcher can carry out experimental research based on the dynamic true triaxial electromagnetic Hopkinson bar system in different temperature fields, and can study the dynamic damage evolution law of the materials such as rock and concrete under the condition that different temperature fields and stress fields are successively or simultaneously applied.

Figure 1:
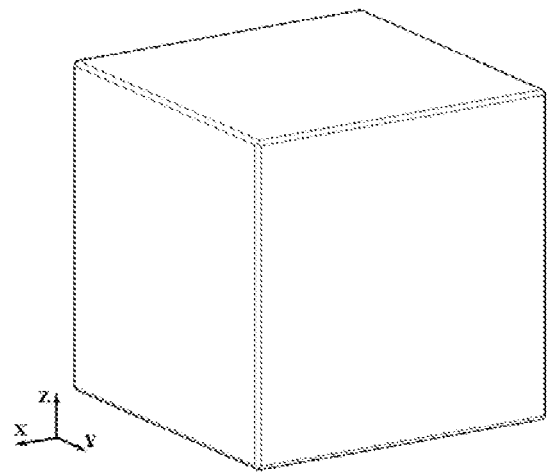
FIG. 1 is a schematic view of a cubic test specimen in a dynamic true triaxial electromagnetic Hopkinson bar system according to one embodiment of the present disclosure.

Reference signs of the components in the figures are as follows:

1, support platform in the direction $X_+$; 2, confining-pressure loading hydraulic cylinder in the direction $X_+$;

3, confining-pressure loading and fixing end baffle in the direction $X_+$; 4, confining-pressure loading actuator in the direction $X_+$; 5, ultrasonic transmitter probe in the direction $X_+$; 6, electromagnetic pulse generator support frame in the direction $X_+$; 7, electromagnetic pulse generator in the direction $X_+$; 8, confining-pressure loading frame in the direction $X_+$; 9, circular bulge in the direction $X_+$; 10, link support bar in the direction $X_+$; 11, square bar in the direction $X_+$; 12, self-lubricating square bar fixation and support frame in the direction $X_+$; 13, square bar centering and positioning guide rail in the direction $X_+$; 14, confining-pressure loading and fixing end baffle in the direction $X_-$; 15, square bar centering and positioning guide rail in the direction $X_-$; 16, support platform in the direction $X_-$; 17, link support bar in the direction $X_-$; 18, confining-pressure loading frame in the direction $X_-$; 19, ultrasonic receiver probe in the direction $X_-$; 20, electromagnetic pulse generator in the direction $X_-$; 21, electromagnetic pulse generator support frame in the direction $X_-$; 22, circular bulge in the direction $X_-$; 23, square bar in the direction $X_-$; 24, self-lubricating square bar fixation and support frame in the direction $X_-$; 25, link square bar in the direction $Y_+$; 26, confining-pressure loading and fixing end baffle in the direction $Y_+$; 27, confining-pressure loading hydraulic cylinder in the direction $Y_+$; 28, support platform in the direction $Y_+$; 29, square bar centering and positioning guide rail in the direction $Y_+$; 30, confining-pressure loading actuator in the direction $Y_+$; 31, confining-pressure loading frame in the direction $Y_+$; 32, ultrasonic transmitter probe in the direction $Y_+$; 33, electromagnetic pulse generator support frame in the direction $Y_+$; 34, electromagnetic pulse generator in the direction $Y_+$; 35, circular bulge in the direction $Y_+$; 36, square bar in the direction $Y_+$; 37, self-lubricating square bar fixation and support frame in the direction $Y_+$; 38, confining-pressure loading and fixing end baffle in the direction $Y_-$; 39, link support bar in the direction $Y_-$; 40, confining-pressure loading frame in the direction $Y_-$; 41, square bar centering and positioning guide rail in the direction $Y_-$; 42, support platform in the direction $Y_-$; 43, ultrasonic receiver probe in the direction $Y_-$; 44, electromagnetic pulse generator in the direction $Y_-$; 45, electromagnetic pulse generator support frame in the direction $Y_-$; 46, circular bulge in the direction $Y_-$; 47, square bar in the direction $Y_-$; 48, self-lubricating square bar fixation and support frame in the direction $Y_-$; 49, confining-pressure loading hydraulic cylinder in the direction $Z_+$; 50, confining-pressure loading actuator in the direction $Z_+$; 51, confining-pressure loading frame in the direction $Z_+$; 52, vertical fixation and support frame in the direction $Z_+$; 53, ultrasonic transmitter probe in the direction $Z_+$; 54, electromagnetic pulse generator support frame in the direction $Z_+$; 55, electromagnetic pulse generator in the direction $Z_+$; 56, circular bulge in the direction $Z_+$; 57, square bar centering and positioning guide rail in the direction $Z_+$; 58, self-lubricating square bar fixation and support frame in the direction $Z_+$; 59, square bar in the direction $Z_+$; 60, self-lubricating square bar fixation and support frame in the direction $Z_-$; 61, confining-pressure loading frame in the direction $Z_-$; 62, square bar centering and positioning guide rail in the direction $Z_-$; 63, square bar in the direction $Z_-$; 64, circular bulge in the direction $Z_-$; 65, vertical fixation and support frame in the direction $Z_-$; 66, ultrasonic receiver probe in the direction $Z_-$; 67, electromagnetic pulse generator in the direction $Z_-$; 68, electromagnetic pulse generator support frame in the direction $Z_-$; 69, central cubic box; 70, cubic test specimen; 71, central support platform; 72, confining-pressure loading hydraulic cylinder in the direction $X_-$; 73, confining-pressure loading actuator in the direction $X_-$; 74, confining-pressure loading hydraulic cylinder in the direction $Y_-$; 75, confining-pressure loading actuator in the direction $Y_-$; 76, confining-pressure loading and fixing end baffle in the direction $Z_+$; 77, confining-pressure loading hydraulic cylinder in the direction $Z_-$; 78, confining-pressure loading actuator in the direction $Z_-$; 79, temperature control cabinet; 80, first part of the temperature control cabinet; 81, second part of the temperature control cabinet; 82, third part of the temperature control cabinet; 83, fourth part of the temperature control cabinet; 84, bolt connecting hole of the temperature control cabinet; 85, heating hole; 86, heating rod; 87, lead wire; and 88, cushion block of the temperature control cabinet.

DETAILED DESCRIPTION OF THE EMBODIMENTS

The present disclosure will be further described hereafter with reference to the accompanying drawings.

In one embodiment of the present disclosure, provided is a dynamic true triaxial electromagnetic Hopkinson bar system capable of implementing multiple types of tests on a test specimen.

FIG. 1 is a cubic test specimen 70. The cubic test specimen 70 is provided with a 0.5 mm-2 mm chamfer at each edge, so as to leave enough deformation space for the test specimen and prevent square bars from being damaged by impacting each other due to the squeezing and deformation of the test specimen.

Figure 2:
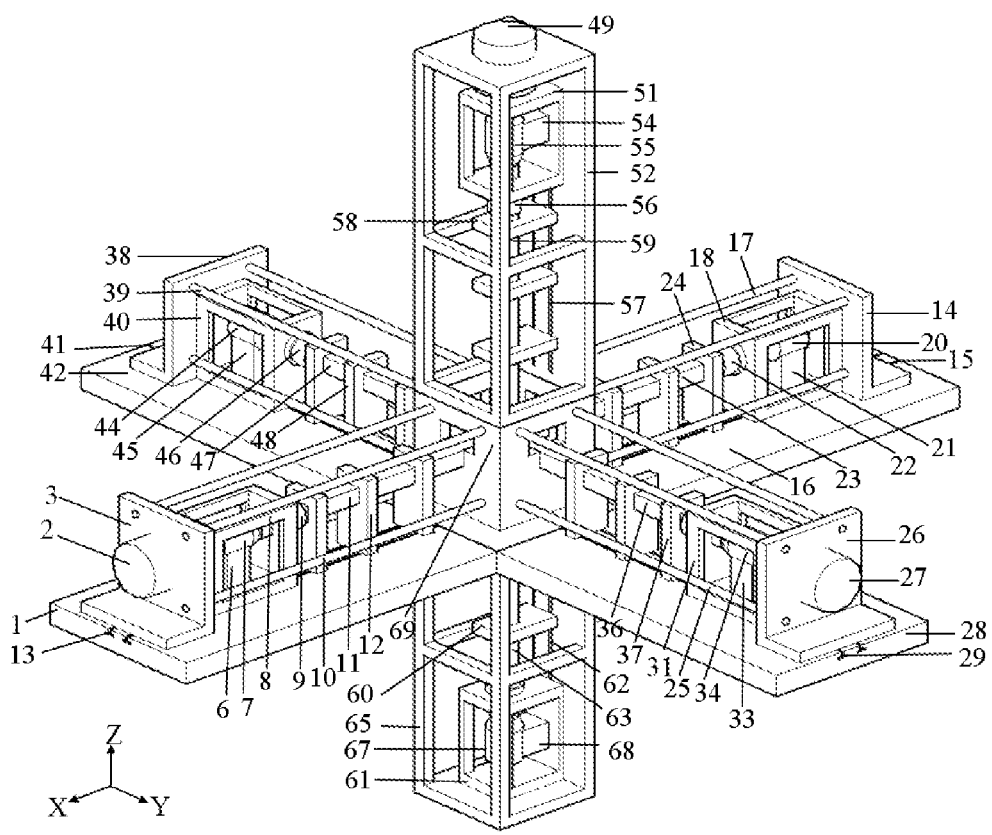
FIG. 2 is a three-dimensional schematic view of the dynamic true triaxial electromagnetic Hopkinson bar system according to one embodiment of the present disclosure.

FIG. 2 is a three-dimensional view of the dynamic true triaxial electromagnetic Hopkinson bar system. A test apparatus is placed on a horizontal cruciform support platform; the platform includes a support platform in the direction $X_+$ 1, a support platform in the direction $X_-$ 16, a support platform in the direction $Y_+$ 28, a support platform in the direction $Y_-$ 42, and a central support platform 71. The upper surface (in the direction $Z_+$) of the central cubic box 69 completely opens; a square opening is disposed at the center of the central cubic box in each direction of $X_+$, $X_-$, $Y_+$, $Y_-$, and $Z_-$, respectively; the size of the square openings is the same as that of the square bars; the central cubic box 69 is disposed in the center of the upper surface of the central support platform 71; the central cubic box and the horizontal cruciform support platform form an orthogonal coordinate system for precisely positioning and centering the dynamic true triaxial electromagnetic Hopkinson bar system.

The confining-pressure loading systems, electromagnetic pulse generators, the square bars, and self-lubricating square bar fixation and support frames in the directions $X_+$, $X_-$, $Y_+$, $Y_-$, $Z_+$, and $Z_-$ are respectively symmetrically arranged by taking the central cubic box 69 as a symmetric center, so as to construct the dynamic true triaxial electromagnetic Hopkinson bar system, wherein the square bar in the direction $X_+$ 11 is fixed by the self-lubricating square bar fixation and support frame in the direction $X_+$ 12; the square bar in the direction $X_+$ and the central cubic box 69 are centered and connected at the square opening in the direction $X_+$ along the square bar centering and positioning guide rail in the direction $X_+$ 13; the confining-pressure loading hydraulic cylinder in the direction $X_+$ 2, the confining-pressure loading actuator in the direction $X_+$ 4, and the confining-pressure loading frame in the direction $X_+$ 8 are combined in series; the electromagnetic pulse generator in the direction $X_+$ 7 and the electromagnetic pulse generator support frame in the direction $X_+$ 6 are placed at the incident end of the square bar in the direction $X_+$ 11 in the confining-pressure loading frame in the direction $X_+$ 8, and are freely and closely attached to the incident end of the square bar in the direction $X_+$ 11; the confining-pressure loading frame in the direction $X_+$ 8 is connected to the circular bulge in the direction $X_+$ 9 in series, and is used to apply a static confining pressure and a dynamic stress pulse load in the direction $X_+$ to the cubic test specimen 70 along the incident end of the square bar in the direction $X_+$ 11; the link support bar in the direction $X_+$ 10 connects the confining-pressure loading and fixing end baffle in the direction $X_+$ 3 to the central cubic box 69, so as to provide a frame fixation and counterforce support system for applying the static confining pressure in the direction $X_+$. The square bar in the direction $X_-$ 23 is fixed by the self-lubricating square bar fixation and support frame in the direction $X_-$ 24; the square bar in the direction $X_-$ and the central cubic box 69 are centered and connected at the square opening in the direction $X_-$ along the square bar centering and positioning guide rail in the direction $X_-$ 15; the electromagnetic pulse generator in the direction $X_-$ 20 and the electromagnetic pulse generator support frame in the direction $X_-$ 21 are placed at the incident end of the square bar in the direction $X_-$ 23 in the confining-pressure loading frame in the direction $X_-$ 18, and are freely and closely attached to the incident end of the square bar in the direction $X_-$ 23; the confining-pressure loading frame in the direction $X_-$ 18 is connected to the circular bulge in the direction $X_-$ 22, and is used to apply a static confining pressure and a dynamic stress pulse load in the direction $X_-$ to the cubic test specimen 70 along the incident end of the square bar in the direction $X_-$ 23; the link support bar in the direction $X_-$ 17 connects the confining-pressure loading and fixing end baffle in the direction $X_-$ 14 to the central cubic box 69, so as to provide a frame fixation and counterforce support system for applying the static confining pressure in the direction $X_-$. The square bar in the direction $Y_+$ 36 is fixed by the self-lubricating square bar fixation and support frame in the direction $Y_+$ 37; the square bar in the direction $Y_+$ 36 and the central cubic box 69 are centered and connected at the square opening in the direction $Y_+$ along the square bar centering and positioning guide rail in the direction $Y_+$ 29; the confining-pressure loading hydraulic cylinder in the direction $Y_+$ 27, the confining-pressure loading actuator in the direction $Y_+$ 30, and the confining-pressure loading frame in the direction $Y_+$ 31 are combined in series; the electromagnetic pulse generator in the direction $Y_+$ 34 and the electromagnetic pulse generator support frame in the direction $Y_+$ 33 are placed at the incident end of the square bar in the direction $Y_+$ 36 in the confining-pressure loading frame in the direction $Y_+$ 31, and are freely and closely attached to the incident end of the square bar in the direction $Y_+$ 36; the confining-pressure loading frame in the direction $Y_+$ 31 is connected to the circular bulge in the direction $Y_+$ 35 in series, and is used to apply a static confining pressure and a dynamic stress pulse load in the direction $Y_+$ to the cubic test specimen 70 along the incident end of the square bar in the direction $Y_+$ 36; the link support bar in the direction $Y_+$ 25 connects the confining-pressure loading and fixing end baffle in the direction $Y_+$ 26 to the central cubic box 69, so as to provide a frame fixation and counterforce support system for applying the static confining pressure in the direction $Y_+$. The square bar in the direction $Y_-$ 47 is fixed by the self-lubricating square bar fixation and support frame in the direction $Y_-$ 48; the square bar in the direction $Y_-$ 47 and the central cubic box 69 are centered and connected at the square opening in the direction $Y_-$ along the square bar centering and positioning guide rail in the direction $Y_-$ 41; the electromagnetic pulse generator in the direction $Y_-$ 44 and the electromagnetic pulse generator support frame in the direction $Y_-$ 45 are placed at the incident end of the square bar in the direction $Y_-$ 47 in the confining-pressure loading frame in the direction $Y_-$ 40, and are freely and closely attached to the incident end of the square bar in the direction $Y_-$ 47; the confining-pressure loading frame in the direction $Y_-$ 40 is connected to the circular bulge in the direction $Y_-$ 46, and is used to apply a static confining pressure and a dynamic stress pulse load in the direction $Y_-$ to the cubic test specimen 70 along the incident end of the square bar in the direction $Y_-$ 47; the link support bar in the direction $Y_-$ 39 connects the confining-pressure loading and fixing end baffle in the direction $Y_-$ 38 to the central cubic box 69, so as to provide a frame fixation and counterforce support system for applying the static confining pressure in the direction $Y_-$. The square bar in the direction $Z_+$ 59 is fixed by the self-lubricating square bar fixation and support frame in the direction $Z_+$ 58; the square bar in the direction $Z_+$ 59 and the central cubic box 69 are centered and connected at the square opening in the direction $Z_+$ along the square bar centering and positioning guide rail in the direction $Z_+$ 57; the confining-pressure loading hydraulic cylinder in the direction $Z_+$ 49, the confining-pressure loading actuator in the direction $Z_+$ 50, and the confining-pressure loading frame in the direction $Z_+$ 51 are combined in series; the electromagnetic pulse generator in the direction $Z_+$ 55 and the electromagnetic pulse generator support frame in the direction $Z_+$ 54 are placed at the incident end of the square bar in the direction $Z_+$ 59 in the confining-pressure loading frame in the direction $Z_+$ 51, and are freely and closely attached to the incident end of the square bar in the direction $Z_+$ 59; the confining-pressure loading frame in the direction $Z_+$ 51 is connected to the circular bulge in the direction $Z_+$ 56 in series, and is used to apply a static confining pressure and a dynamic stress pulse load in the direction $Z_+$ to the cubic test specimen 70 along the incident end of the square bar in the direction $Z_+$ 59; the vertical fixation and support frame in the direction $Z_+$ 52 is connected to the central cubic box 69 to provide a frame fixation and counterforce support system for applying the static confining pressure in the direction $Z_+$. The square bar in the direction $Z_-$ 63 is fixed by the self-lubricating square bar fixation and support frame in the direction $Z_-$ 60; the square bar in the direction $Z_-$ 63 and the central cubic box 69 are centered and connected at the square opening in the direction $Z_-$ along the square bar centering and positioning guide rail in the direction $Z_-$ 62; the electromagnetic pulse generator in the direction $Z_-$ 67 and the electromagnetic pulse generator support frame in the direction $Z_-$ 68 are placed at the incident end of the square bar in the direction $Z_-$ 63 in the confining-pressure loading frame in the direction $Z_-$ 61, and are freely and closely attached to the incident end of the square bar in the direction $Z_-$ 63; the confining-pressure loading frame in the direction $Z_-$ 61 is connected to the circular bulge in the direction $Z_-$ 64, and is used to apply a static confining pressure and a dynamic stress pulse load in the direction $Z_-$ to the cubic test specimen 70 along the incident end of the square bar in the direction $Z_-$ 63; the vertical fixation and support frame in the direction $Z_-$ 65 is connected to the central cubic box 69 to provide a frame fixation and counterforce support system for applying the static confining pressure in the direction $Z_-$.

Figure 3:
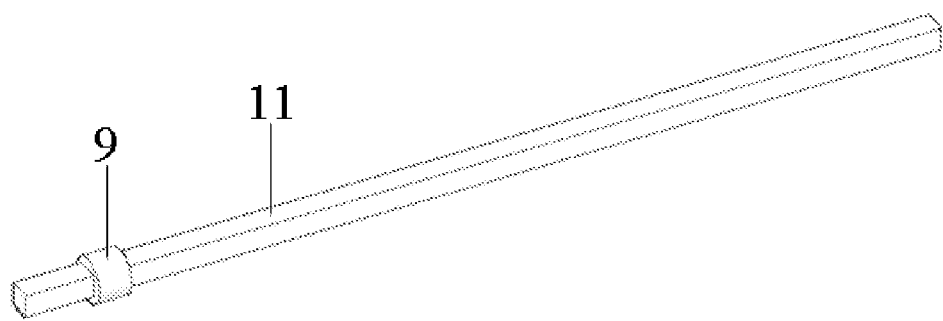
FIG. 3 is a three-dimensional schematic view of a square bar and a circular bulge in the dynamic true triaxial electromagnetic Hopkinson bar system according to one embodiment of the present disclosure.
Figure 4:
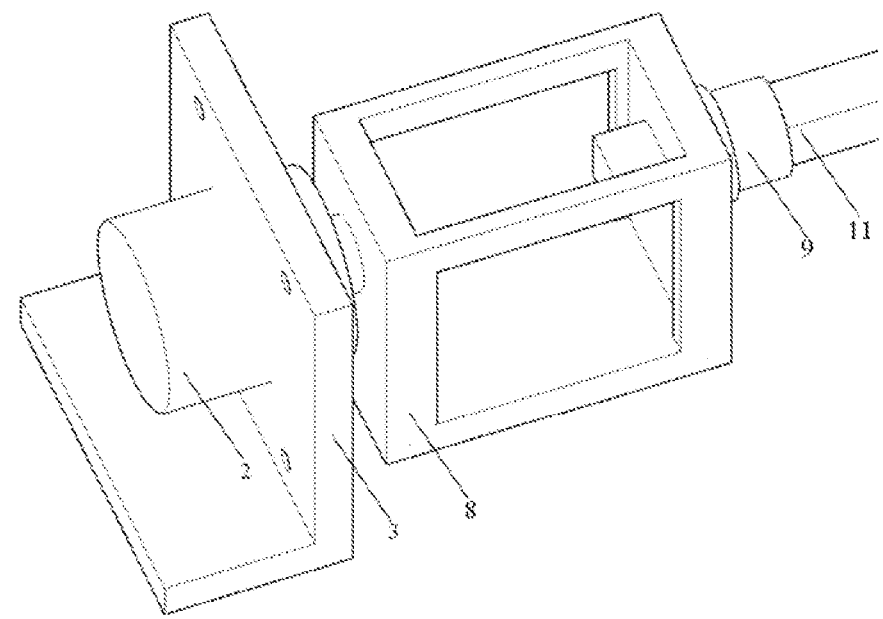
FIG. 4 is a three-dimensional schematic view showing the connection of the circular bulge and a confining-pressure loading system in the dynamic true triaxial electromagnetic Hopkinson bar system according to one embodiment of the present disclosure.
Figure 5:
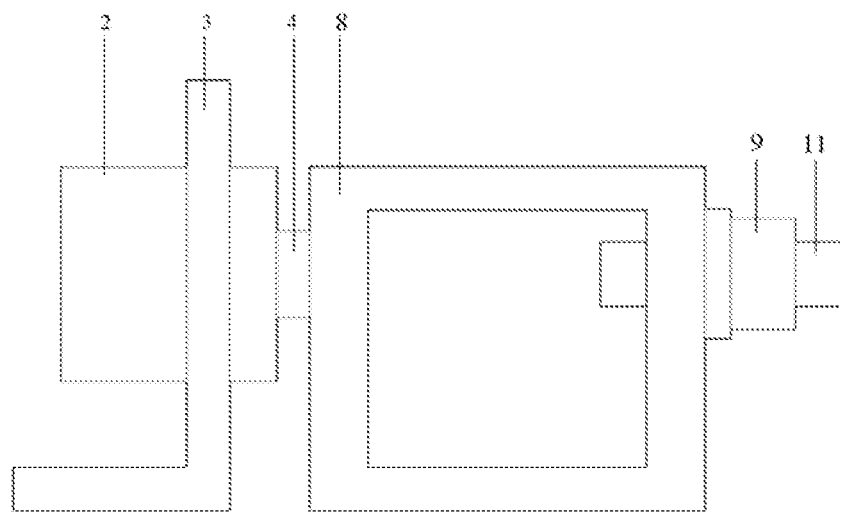
FIG. 5 is a two-dimensional front view showing the connection of the circular bulge and a confining-pressure loading system in the dynamic true triaxial electromagnetic Hopkinson bar system according to one embodiment of the present disclosure.

As shown in FIGS. 3-5, the circular bulge in the direction $X_+$ 9 is placed at the incident end of the square bar in the direction $X_+$ 11; the distance from the circular bulge to the loading end of the incident stress wave of the square bar is about 3%-7% of the length of the square bar; the length of the circular bulge can be 1.5%-4% of the length of the square bar; and the diameter of the circular bulge can be 1.5-2.5 times the side length of the cross section of the square bar.

Figure 6:
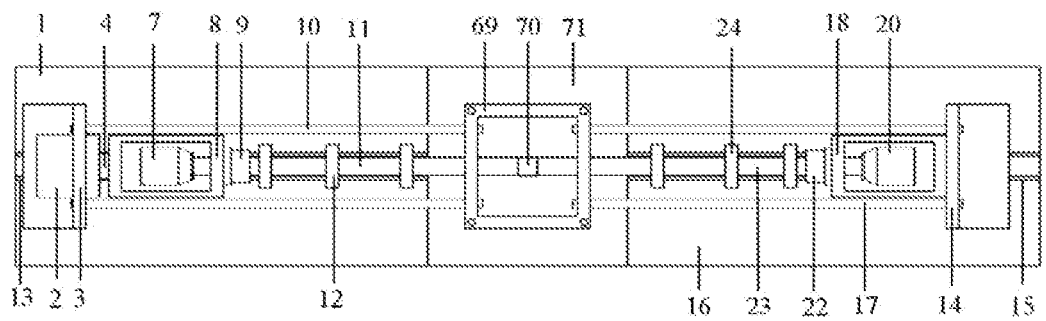
FIG. 6 is a vertical view of a uni-axial and bidirectional hydraulic loading system in the direction X in the dynamic true triaxial electromagnetic Hopkinson bar system according to one embodiment of the present disclosure.

FIG. 6 is a vertical view of a true triaxial dynamic-static combined loading Hopkinson bar. The operating principle of a synchronous-servo-controlled static-dynamic-stress loading system of the dynamic true triaxial electromagnetic Hopkinson bar is (by taking a uni-axial and bidirectional hydraulic loading system as an example) as follows: the electromagnetic Hopkinson bar in the direction $X_+$ consists of a confining-pressure loading and fixing end baffle in the direction $X_+$ 3, a confining-pressure loading hydraulic cylinder in the direction $X_+$ 2, a confining-pressure loading actuator in the direction $X_+$ 4, an electromagnetic pulse generator in the direction $X_+$ 7, a link support bar in the direction $X_+$ 10, a square bar in the direction $X_+$ 11, a self-lubricating square bar fixation and support frame in the direction $X_+$ 12, an electromagnetic pulse generator support frame in the direction $X_+$ 6, and a square bar centering and positioning guide rail in the direction $X_+$ 13, wherein the square bar in the direction $X_+$ 11 is fixed by the self-lubricating square bar fixation and support frame in the direction $X_+$ 12; the square bar in the direction $X_+$ and the central cubic box 69 are centered and connected at the square opening in the direction $X_+$ along the square bar centering and positioning guide rail in the direction $X_+$ 13; the confining-pressure loading hydraulic cylinder in the direction $X_+$ 2, the confining-pressure loading actuator in the direction $X_+$ 4, and the confining-pressure loading frame in the direction $X_+$ 8 are combined in series; the confining-pressure loading frame in the direction $X_+$ 8 is connected to the circular bulge in the direction $X_+$ 9 in series, and is used to apply a static confining pressure in the direction $X_+$ to the test specimen along the incident end of the square bar in the direction $X_+$ 11; the electromagnetic pulse generator in the direction $X_+$ 7 and the electromagnetic pulse generator support frame in the direction $X_+$ 6 are placed at the incident end of the square bar in the direction $X_+$ 11 in the confining-pressure loading frame in the direction $X_+$ 8, and are freely and closely attached to the incident end of the square bar in the direction $X_+$ 11, and are used to apply a dynamic stress pulse load in the direction $X_+$ to the cubic test specimen along the incident end of the square bar in the direction $X_+$ 11; the link support bar in the direction $X_+$ 10 connects the confining-pressure loading and fixing end baffle in the direction $X_+$ 3 to the central cubic box 69, so as to provide a frame fixation and counterforce support system for applying the static confining pressure in the direction $X_+$. The square bar in the direction $X_-$ 23 is fixed by the self-lubricating square bar fixation and support frame in the direction $X_-$ 24; the square bar in the direction $X_-$ and the central cubic box 69 are centered and connected at the square opening in the direction $X_-$ along the square bar centering and positioning guide rail in the direction $X_-$ 15; the electromagnetic pulse generator in the direction $X_-$ 20 and the electromagnetic pulse generator support frame in the direction $X_-$ 21 are placed at the incident end of the square bar in the direction $X_-$ 23 in the confining-pressure loading frame in the direction $X_-$ 18, and are freely and closely attached to the an incident end of the square bar in the direction $X_-$ 23; the confining-pressure loading frame in the direction $X_-$ 18 is connected to the circular bulge in the direction $X_-$ 22 in series, and is used to apply a static confining pressure and a dynamic stress pulse load in the direction $X_-$ to the test specimen along the incident end of the square bar in the direction $X_-$ 23; the link support bar in the direction $X_-$ 17 connects the confining-pressure loading and fixing end baffle in the direction $X_-$ 14 to the central cubic box 69, so as to provide a frame fixation and counterforce support system for applying the static confining pressure in the direction $X_-$.

After the apparatus and the cubic test specimen 70 are mounted in the above mode, a high pressure oil pipe is opened to fill the confining-pressure loading hydraulic cylinder in the direction $X_+$ 2 with oil by means of an oil inlet; and the confining-pressure loading actuator in the direction $X_+$ 4 is pushed to move forward and contact the confining-pressure loading frame in the direction $X_+$ 8; an oil pressure is continuously applied to push the confining-pressure loading actuator in the direction $X_+$ 4 to move forward; an axial pressure is transferred to the square bar in the direction $X_+$ 11 by means of the circular bulge in the direction $X_+$ 9, and then acts on the cubic test specimen 70, so that the cubic test specimen is under a precise static prestress (confining pressure) in the direction X. Similarly, the static confining-pressure loading principle in the directions Y and Z is the same as that in the direction X. It should be noted that the static prestress can be synchronously controlled and loaded in the directions X, Y, and Z by means of the static confining-pressure loading servo controlled system, and the load amplitudes can be flexibly set for the static prestress in the directions X, Y, and Z according to test requirements.

Figure 7:
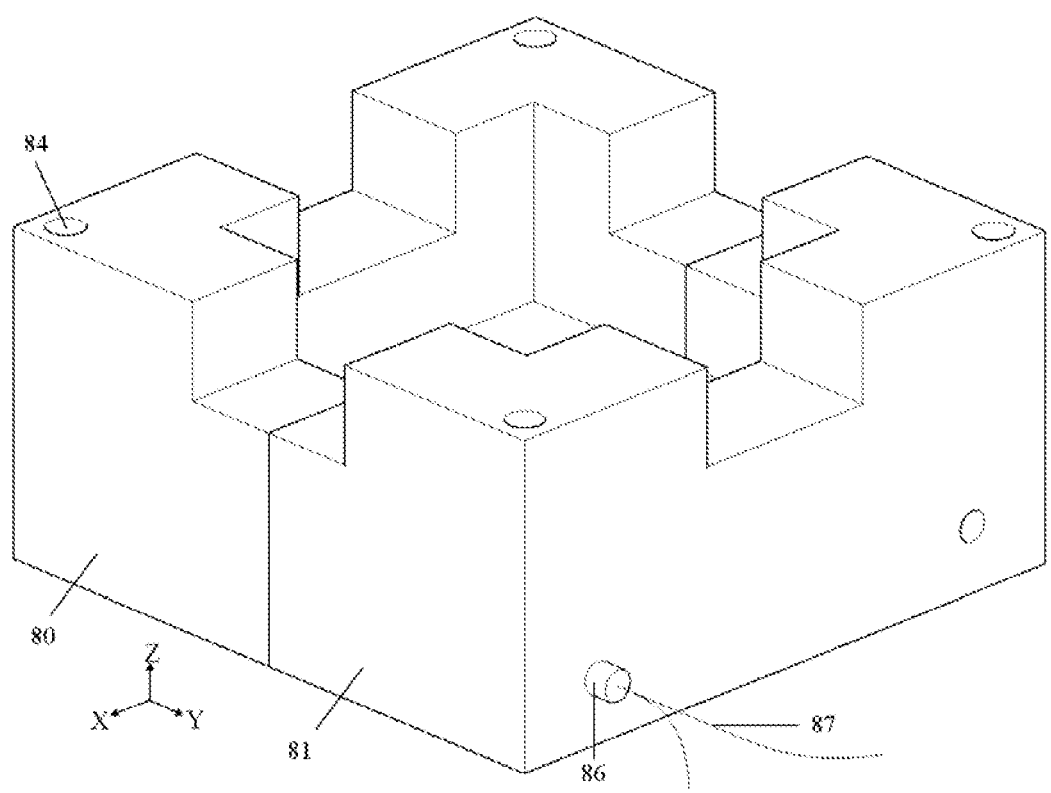
FIG. 7 is a three-dimensional schematic view of a section of the temperature control cabinet in the dynamic true triaxial electromagnetic Hopkinson bar system according to one embodiment of the present disclosure.
Figure 8:
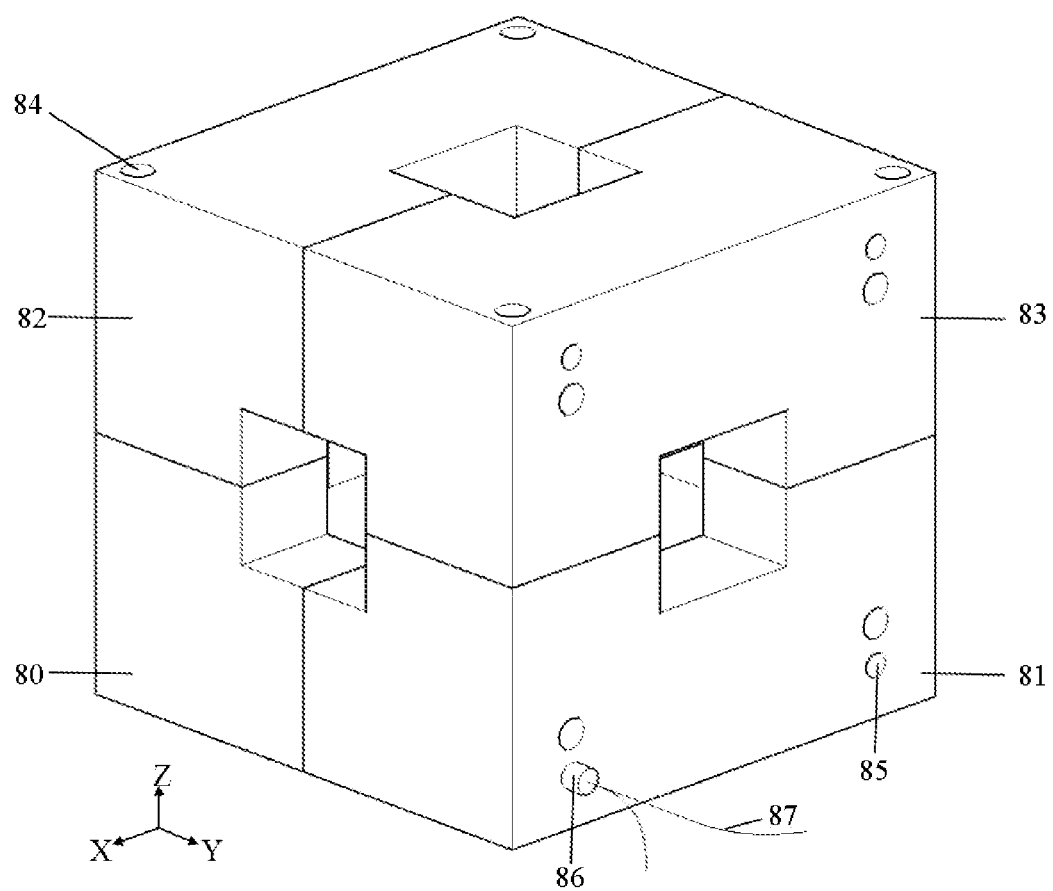
FIG. 8 is a three-dimensional schematic view of the temperature control cabinet in the dynamic true triaxial electromagnetic Hopkinson bar system according to one embodiment of the present disclosure.

In another embodiment of the present disclosure, the dynamic true triaxial electromagnetic Hopkinson bar system further includes a temperature control system, wherein the temperature control system is used to heat the test specimen in in-situ condition and maintained at a constant temperature, and can carry out experimental research under dynamic impact loading at different temperatures using the true triaxial electromagnetic Hopkinson bar. FIG. 7 is three-dimensional schematic view of a section of the temperature control cabinet, and FIG. 8 is a three-dimensional schematic view of the temperature control cabinet.

Heating holes 85 are built in the temperature control cabinet 79, and heating rods 86 with lead wires 87 are placed in the heating holes 85. The temperature control apparatus under true triaxial dynamic-static combined loading is a prominent advantage of the dynamic true triaxial electromagnetic Hopkinson bar system. The temperature control apparatus is a minitype heating system consisting of an intelligent temperature control sensor and several thermocouples built in the heating cabinet; the volume of the hearth of the heating cabinet is about two times that of the test specimen, with the purposes of keeping a uniform temperature in the hearth and avoiding the test specimen from being non-uniformly heated. During testing, a temperature control software system controls the thermocouples, and sets a temperature rise rate and temperature range (the temperature range is from a normal temperature to 1000° C., preferably 20° C.-300° C.); then, the intelligent temperature control sensor feeds back a real-time temperature to a display software system, thereby ensuring to heat to a preset temperature. After heating to the preset temperature, an electromagnetic triaxial and six-directional synchronous-coordinated-control loading system can be used to apply a dynamic impact load to the test specimen, so as to carry out relevant dynamic tests, and implement the research on dynamic true triaxial loading tests on the cubic test specimen under the in situ coupled action of temperature and static pressure.

Figure 9:
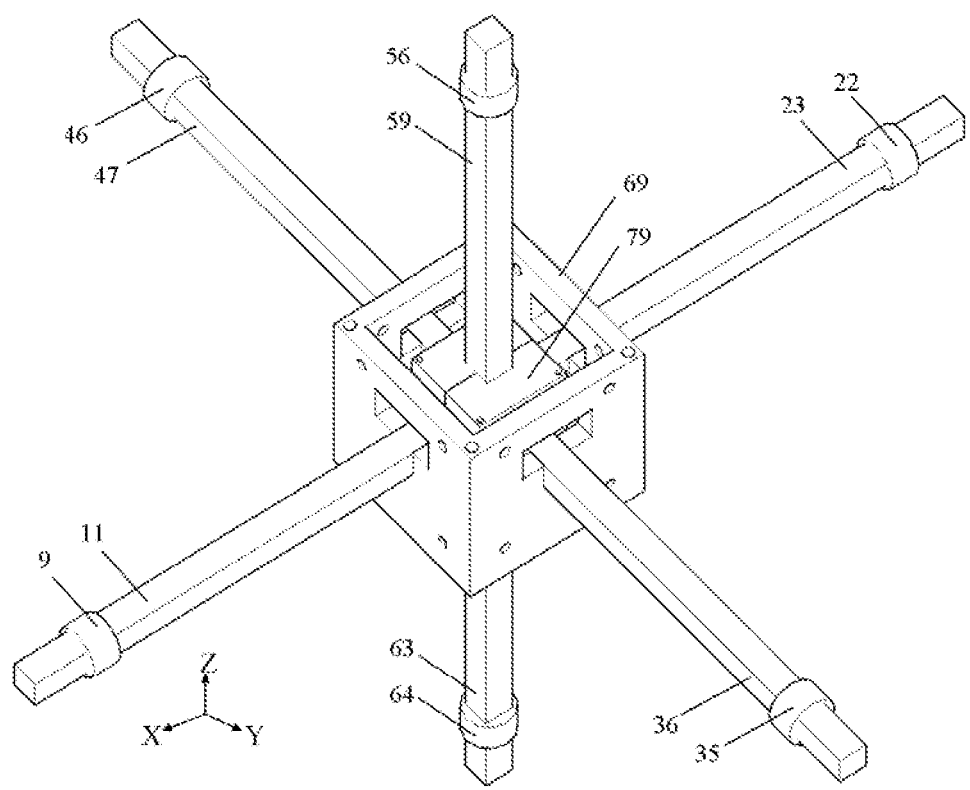
FIG. 9 is a three-dimensional view of the temperature-pressure coupling structure of the dynamic true triaxial electromagnetic Hopkinson bar system according to one embodiment of the present disclosure.
Figure 10:
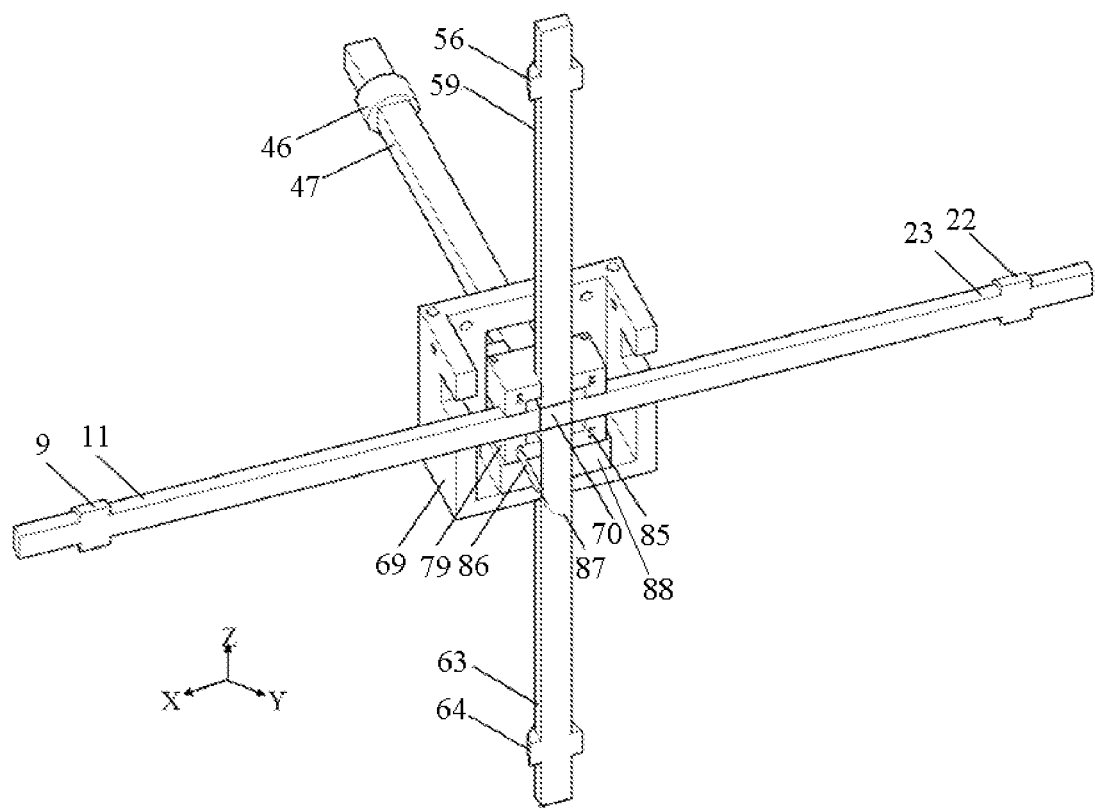
FIG. 10 is a three-dimensional view of a section of the temperature-pressure coupling structure of the dynamic true triaxial electromagnetic Hopkinson bar system according to one embodiment of the present disclosure.

FIG. 9 is a three-dimensional view of a temperature-pressure coupling structure. FIG. 10 is a three-dimensional view of a section of the temperature-pressure coupling structure.

The dynamic true triaxial electromagnetic Hopkinson bar system with a temperature control system can be used to implement experimental research at different temperatures. The steps are as follows:

Step 1, assembling the temperature control cabinet 79: first, connecting the first part 80 and the second part 81 of the temperature control cabinet 79; then, mounting the third part 82; next, connecting the first part 80 and the second part 81 to the third part 82; and finally mounting and fixedly connecting the fourth part 83 of the temperature control cabinet to form a complete temperature control apparatus;

Step 2, mounting temperature control cabinet cushion block 88: placing the detachable temperature control cabinet cushion block 88 in the center of the bottom surface of the central cubic box 69;

Step 3, after completing the step 2, placing the temperature control cabinet 79 in the step 1 in the center of the upper surface of the temperature control cabinet cushion block 88 in the step 2, and locating the test specimen 70 in the center of the temperature control cabinet 79, so as to complete the mounting step of the temperature control system of the dynamic true triaxial electromagnetic Hopkinson bar system;

Step 4, after completing the step 3, heating the test specimen 70, controlling thermocouples by means of a temperature control software system, setting a temperature rise rate and temperature range (the temperature range is from a normal temperature to 1000° C., preferably 20° C.-300° C.); then, feeding back a real-time temperature to a display software system by means of an intelligent temperature control sensor, heating to a preset temperature, and then maintaining the test specimen 70 in a constant temperature state.

Step 5, after completing the step 4, applying a static prestress (confining pressure) to the test specimen 70 (the static prestress (confining pressure) is applied in the mode as shown in FIG. 6); after static prestress (confining pressure) is applied, the electromagnetic triaxial and six-directional synchronous-coordinated-control loading system can be used to apply a dynamic impact load to the test specimen, so as to implement the research on dynamic true triaxial loading tests on the cubic test specimen under the in situ coupled action of temperature and static pressure.

In another embodiment of the present disclosure, the dynamic true triaxial electromagnetic Hopkinson bar system can be used to realize dynamic damage of solid materials and ultrasonic wave propagation tests, so as to achieve the function of testing dynamic damage evolution of solid materials such as rock, concrete and the like with in situ pressure retaining state under dynamic impact, and their influences on ultrasonic wave propagation speed, attenuation laws of ultrasonic wave amplitude, frequency spectrum and the like.

Figure 11:
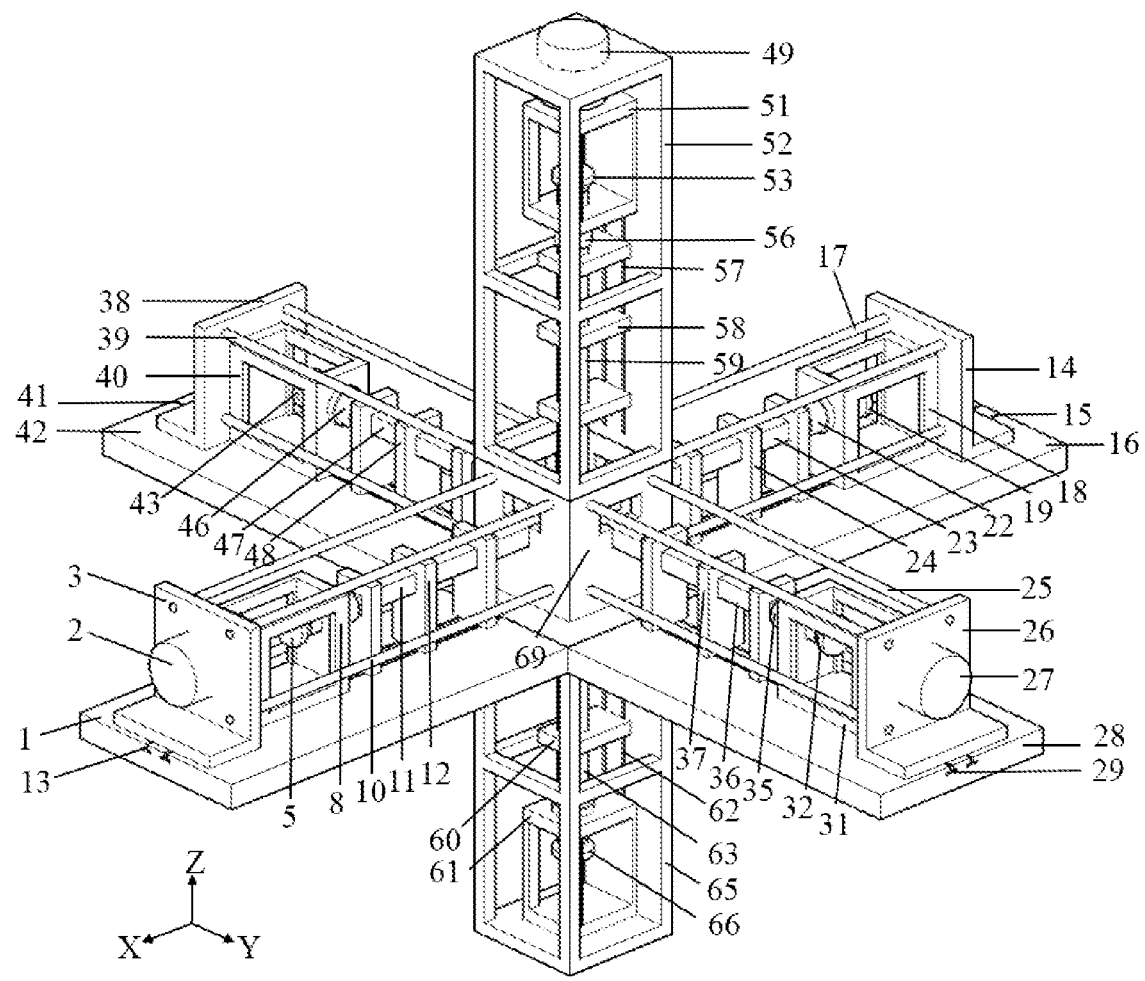
FIG. 11 is a three-dimensional view of a dynamic damage testing system in the dynamic true triaxial electromagnetic Hopkinson bar system according to another embodiment of the present disclosure.
Figure 12:
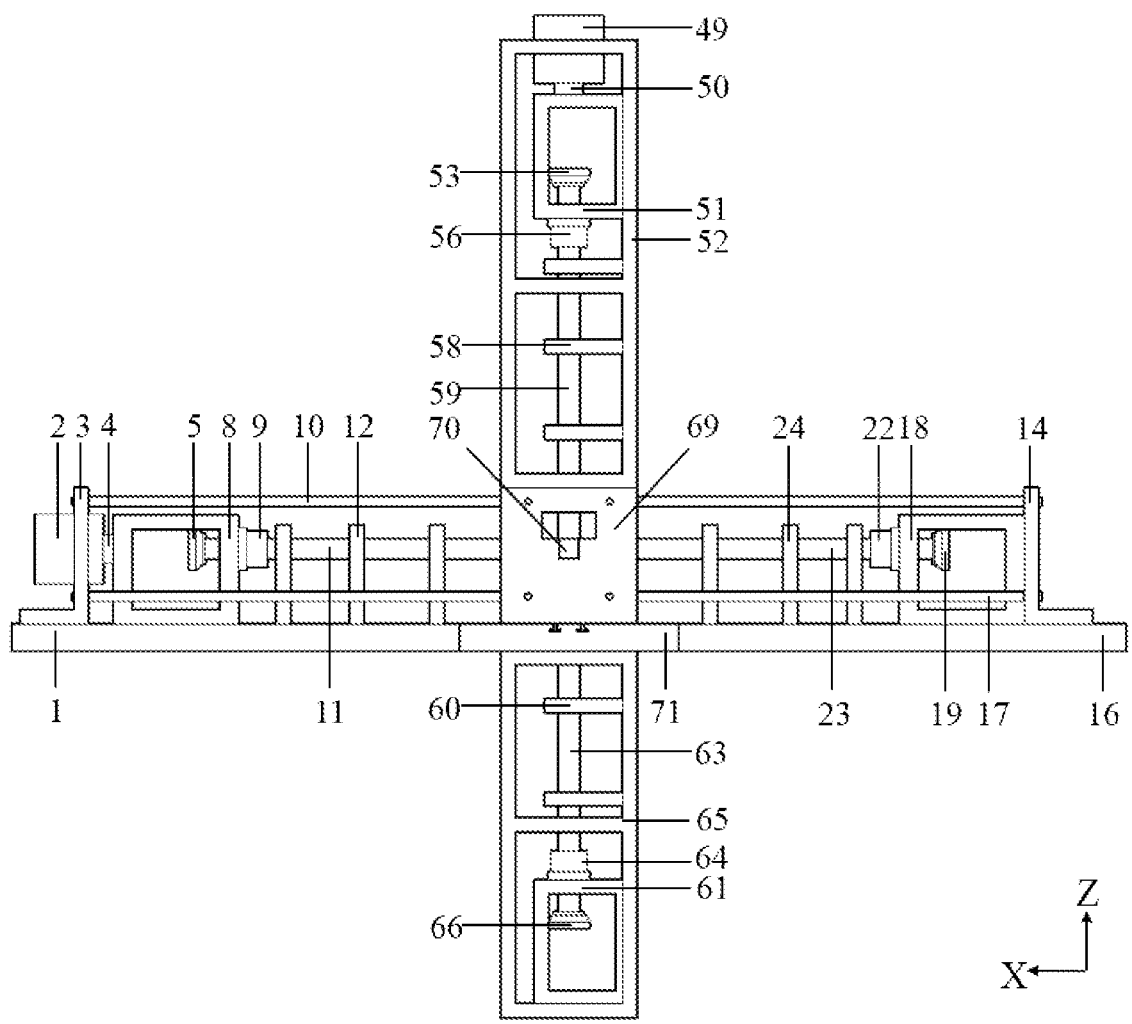
FIG. 12 is a front view of the dynamic damage testing system in the dynamic true triaxial electromagnetic Hopkinson bar system according to another embodiment of the present disclosure.
Figure 13:
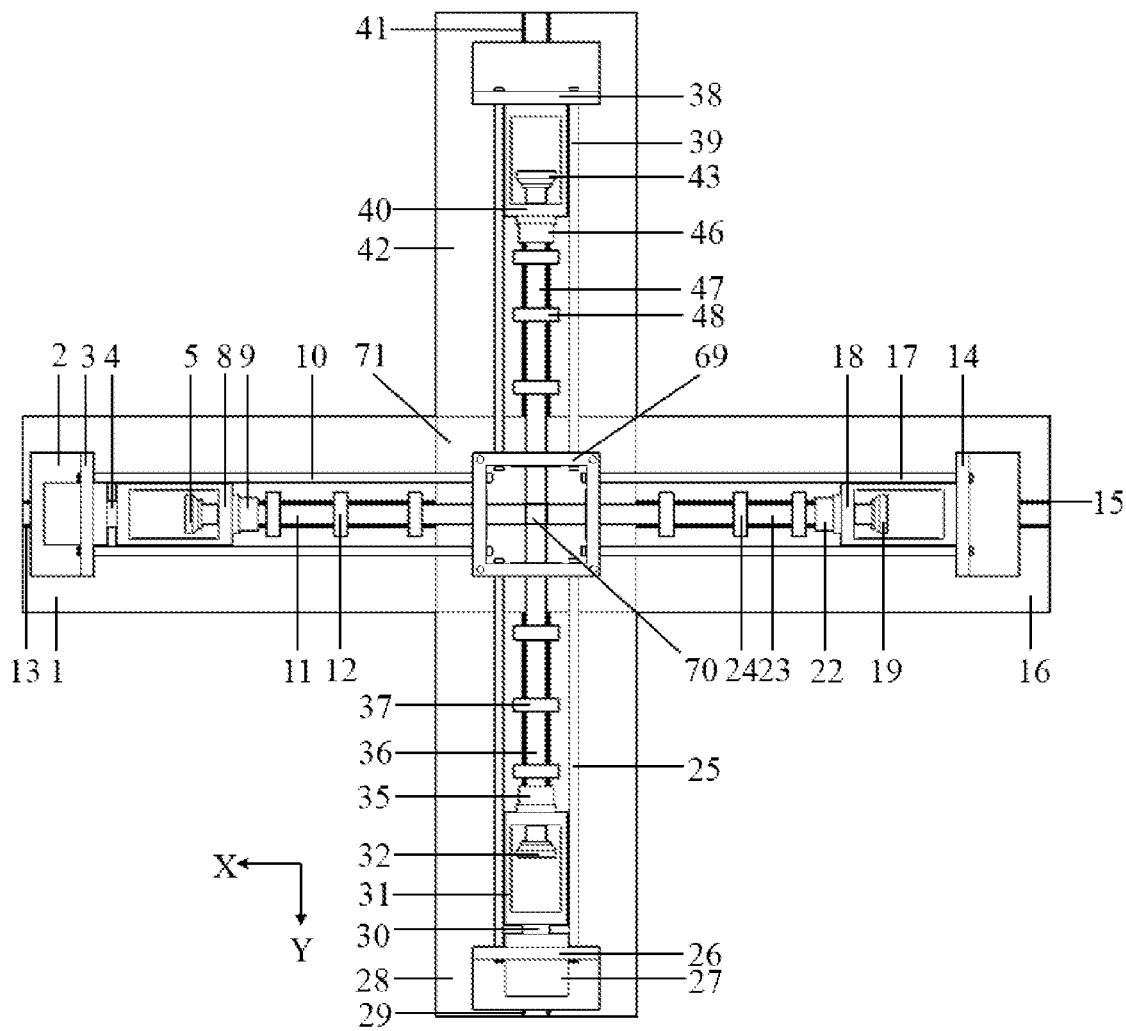
FIG. 13 is a vertical view of the dynamic damage testing system in the dynamic true triaxial electromagnetic Hopkinson bar system according to another embodiment of the present disclosure.

As shown in FIGS. 11, 12, and 13, the dynamic true triaxial electromagnetic Hopkinson bar system of the present disclosure realizes the dynamic damage of solid materials and ultrasonic wave propagation tests. The confining-pressure loading systems, the electromagnetic pulse generators, the square bars, and the self-lubricating square bar fixation and support frames in the directions $X_+$, $X_-$, $Y_+$, $Y_-$, $Z_+$, and $Z_-$ are respectively symmetrically arranged by taking the central cubic box 69 as a symmetric center, so as to construct the dynamic true triaxial electromagnetic Hopkinson bar system. The specific configurations of the dynamic true triaxial electromagnetic Hopkinson bar system are the same as that in the above embodiment, and will not be repeated here.

The present disclosure provides a specific method for using the dynamic true triaxial electromagnetic Hopkinson bar system to implement dynamic damage of solid materials and ultrasonic wave propagation tests, including the following steps:

step 1, before a static prestress (confining pressure) and an impact load are applied, in the direction $X_+$, utilizing the ultrasonic transmitter probe 5 at the incident end of the square bar in the direction $X_+$ 11 to emit an ultrasonic incident signal, wherein the ultrasonic signal propagates along the square bar in the direction $X_+$ 11, passes through the cubic test specimen 70, and then continuously propagates to the square bar as the transmitted ultrasonic signal in the direction $X_-$ 23, which is finally received by the ultrasonic receiver probe 19 placed at the incident end of the square bar in the direction $X_-$ 23; recording and storing a complete ultrasonic signal in the direction X without application of the static prestress (confining pressure) and the impact load; in the direction Y, utilizing the ultrasonic transmitter probe 32 at the incident end of the square bar in the direction $Y_+$ 36 to emit an ultrasonic incident signal, wherein the ultrasonic signal propagates along the square bar in the direction $Y_+$ 36, passes through the cubic test specimen 70, and then continuously propagates to the square bar in the direction $Y_-$ 47 as the transmitted ultrasonic signal, which is finally received by the ultrasonic receiver probe 43 placed at the incident end of the square bar in the direction $Y_-$ 47; recording and storing a complete ultrasonic signal in the direction Y without application of the static prestress (confining pressure) and the impact load; in the direction Z, utilizing the ultrasonic transmitter probe 53 at the incident end of the square bar in the direction $Z_+$ 59 to emit an ultrasonic incident signal, wherein the ultrasonic signal propagates along the square bar in the direction $Z_+$ 59, passes through the cubic test specimen 70, and then continuously propagates to the square bar in the direction $Z_-$ 63 as the transmitted ultrasonic signal, which is finally received by the ultrasonic receiver probe 66 at the incident end of the square bar in the direction $Z_-$ 63; recording and storing a complete ultrasonic signal in the direction Z without application of the static prestress (confining pressure) and the impact load;

step 2, applying the static prestress (confining pressure), wherein a mode of applying the static prestress (confining pressure) is provided by taking the direction X as an example: after the apparatus and the cubic test specimen 70 are mounted in the mode as shown in FIG. 2, opening a high pressure oil pipe, filling the confining-pressure loading hydraulic cylinder in the direction $X_+$ 2 with oil by means of an oil inlet, and pushing the confining-pressure loading actuator in the direction $X_+$ 4 to move forward and contact the confining-pressure loading frame in the direction $X_+$ 8; continuously applying an oil pressure to push the confining-pressure loading actuator in the direction $X_+$ 4 to move forward and then transfers an axial pressure to the square bar in the direction $X_+$ 11 by means of the circular bulge in the direction $X_+$ 9, and then loading the axial pressure on the cubic test specimen 70, so that the cubic test specimen is under a precise static prestress (confining pressure) in the direction X. Similarly, the static confining-pressure loading principle in the directions Y and Z is the same as that in the direction X. It should be noted that the static prestress can be synchronously controlled and loaded in the directions X, Y, and Z by means of the static confining-pressure loading servo controlled system, and the load amplitudes can be flexibly set for the static prestress in the directions X, Y, and Z according to test requirements;

step 3, after the static prestress (confining pressure) is applied, re-utilizing the ultrasonic transmitter probe 5 at the incident end of the square bar in the direction $X_+$ 11 to emit an ultrasonic incident signal, and utilizing the ultrasonic receiver probe 19 at the incident end of the square bar in the direction $X_-$ 23 to receive the transmitted ultrasonic signal passing through the test specimen loaded with static prestress, recording and storing a complete ultrasonic signal in the direction X after the static prestress (confining pressure) is applied; in the direction Y, utilizing the ultrasonic transmitter probe 32 at the incident end of the square bar in the direction $Y_+$ 36 to emit an ultrasonic incident signal, and utilizing the ultrasonic receiver probe 43 at the incident end of the square bar in the direction $Y_-$ 47 to receive the transmitted ultrasonic signal passing through the test specimen loaded with static prestress, recording and storing a complete ultrasonic signal in the direction Y after the static prestress (confining pressure) is applied; in the direction Z, utilizing the ultrasonic transmitter probe 53 at the incident end of the square bar in the direction $Z_+$ 59 to emit an ultrasonic incident signal, utilizing the ultrasonic receiver probe 66 at the incident end of the square bar in the direction $Z_-$ 63 to receive the transmitted ultrasonic signal passing through the test specimen loaded with static prestress, recording and storing a complete ultrasonic signal in the direction Z after the static prestress (confining pressure) is applied;

step 4, applying the impact load, wherein a mode of applying the impact load is provided by taking the direction X as an example: after the step 3 is completed, moving the ultrasonic transmitter probe 5 and the ultrasonic receiver probe 19 closely attached to the incident end of the square bars in the directions $X_+$ and $X_-$ 11 and 23, respectively, then, placing an electromagnetic pulse generator in the direction $X_+$ 7 and an electromagnetic pulse generator support frame in the direction $X_+$ 6 at the incident end of the square bar in the direction $X_+$ 11 in the confining-pressure loading frame in the direction $X_+$ 8, wherein the electromagnetic pulse generator in the direction $X_+$ 7 is freely and closely attached to the incident end of the square bar in the direction $X_+$ 11, and is used to apply a dynamic stress pulse load in the direction $X_+$ to the test specimen along the incident end of the square bar in the direction $X_+$ 11; and placing an electromagnetic pulse generator in the direction $X_-$ 20 and an electromagnetic pulse generator support frame in the direction $X_-$ 21 at the incident end of the square bar in the direction $X_-$ 23 in the confining-pressure loading frame in the direction $X_-$ 18, wherein the electromagnetic pulse generator in the direction $X_-$ 20 is freely and closely attached to the incident end of the square bar in the direction $X_-$ 23, and is used to apply a dynamic stress pulse load in the direction $X_-$ to the test specimen along the incident end of the square bar in the direction $X_-$ 23; similarly, after performing the same operations as those in the direction X in the directions Y and Z, then utilizing the triaxial and six-directional synchronous-coordinated-control electromagnetic loading system to apply dynamic impact loads to the test specimen along the directions X, Y and Z. It should be noted that the dynamic impact load can be synchronously or asynchronous controlled and loaded in the directions X, Y, and Z by means of the triaxial and six-directional synchronous-coordinated-control electromagnetic loading system, and the load amplitudes can be flexibly set for the dynamic impact loads in the directions X, Y, and Z respectively according to test requirements;

step 5, after the dynamic impact loading test is completed, continuously remaining the static prestress in the directions X, Y, and Z unchanged, namely, not releasing the static prestress, then removing the electromagnetic pulse generator in the direction $X_+$ 7 and the electromagnetic pulse generator support frame in the direction $X_+$ 6, and placing the ultrasonic transmitter probe 5 at the incident end of the square bar in the direction $X_+$ 11 in the confining-pressure loading frame in the direction $X_+$ 8, wherein the ultrasonic transmitter probe is freely and closely attached to the incident end of the square bar in the direction $X_+$ 11; similarly, after performing the same operations as those in the direction $X_+$ in the directions $X_-$, $Y_+$, $Y_-$, $Z_+$, and $Z_-$, all the electromagnetic pulse generators and the electromagnetic pulse generator support frames are removed away, and enabling the ultrasonic transmitter probes and the ultrasonic receiver probes to be freely and closely attached to the incident ends of the square bars; subsequently, under the state that the static prestress (confining pressure) is not released, utilizing the ultrasonic transmitter probe 5 at the incident end of the square bar in the direction $X_+$ 11 to emit an ultrasonic incident signal, utilizing the ultrasonic receiver probe 19 at the incident end of the square bar in the direction $X_-$ 23 to receive the transmitted ultrasonic signal passing through the impact loaded test specimen from the direction X, recording and storing a complete ultrasonic signal in the direction X after application of the static prestress (confining pressure) and the dynamic impact load, respectively; in the direction Y, utilizing the ultrasonic transmitter probe 32 at the incident end of the square bar in the direction $Y_+$ 36 to emit an ultrasonic incident signal, utilizing the ultrasonic receiver probe 43 at the incident end of the square bar in the direction $Y_-$ 47 to receive the transmitted ultrasonic signal passing through the impact loaded test specimen from the direction Y, recording and storing a complete ultrasonic signal in the direction Y after application of the static prestress (confining pressure) and the dynamic impact load, respectively; in the direction Z, utilizing the ultrasonic transmitter probe 53 at the incident end of the square bar in the direction $Z_+$ 59 to emit an ultrasonic incident signal, utilizing the ultrasonic receiver probe 66 at the incident end of the square bar in the direction $Z_-$ 63 to receive the transmitted ultrasonic signal passing through the impact loaded test specimen from the direction Z, recording and storing a complete ultrasonic signal in the direction Z after application of the static prestress (confining pressure) and the dynamic impact load, respectively;

In another embodiment of the present disclosure, the square bar of the dynamic true triaxial electromagnetic Hopkinson bar system can be designed to have a large dimension (side length of cross section ≥100 mm), so as to carry out three-dimensional impact tests on large dimension materials such as rock, concrete and the like in a true triaxial static prestress state, thereby enabling a test result to have more practical engineering meaning, wherein the electromagnetic pulse generator of the dynamic true triaxial electromagnetic Hopkinson bar system is an annular electromagnetic pulse generator, and the square bar is a large-size square bar with a side length of cross section greater than or equal to 100 mm. Further, the square bar is a large-size square bar (equivalent to a large-size bar bundle), which is composed of a bundle of small-size square bars (side length of cross section ≤50 mm); therefore, the square bar not only can implement the dynamic impact test on a large dimensional test specimen such as rock and concrete, but also can eliminate dispersion effect and inertia effect of a single large-size square bar during stress wave propagation, and can measure stress-strain feature of different parts of the test specimen.

Figure 14:
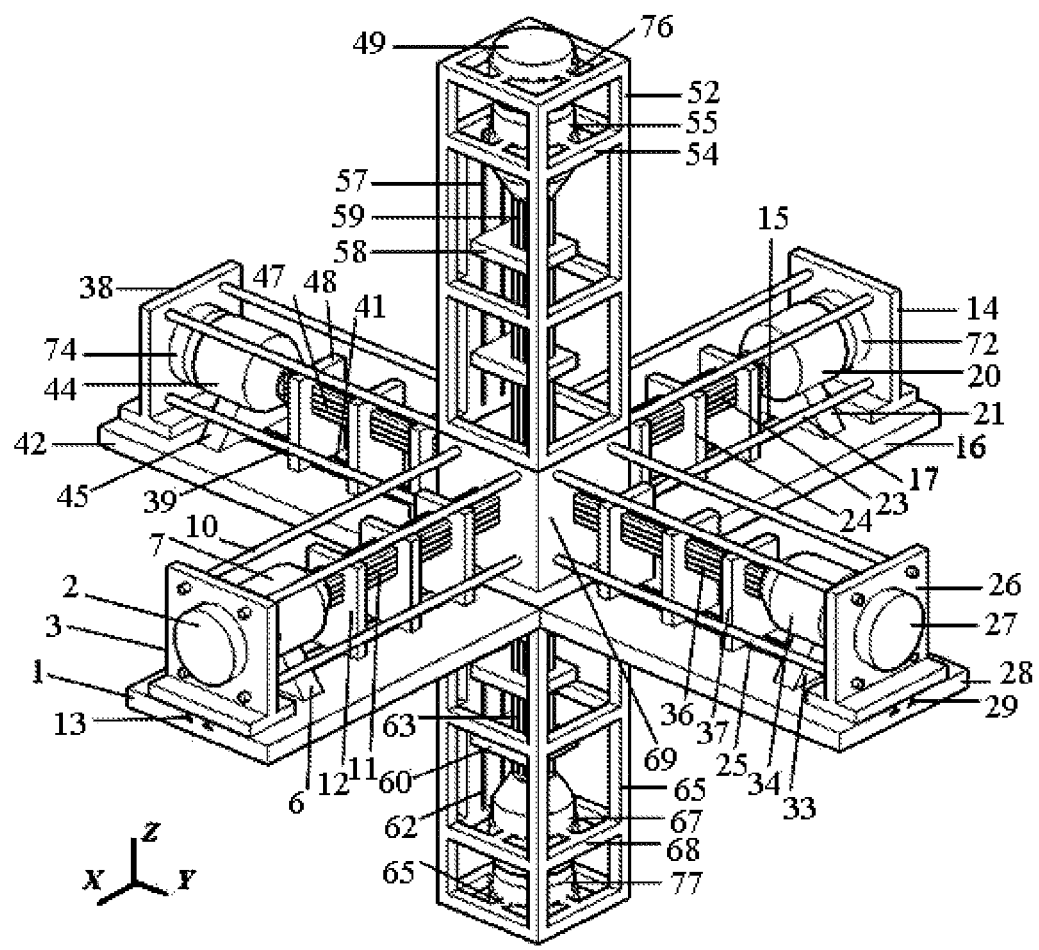
FIG. 14 is a three-dimensional schematic view of the dynamic true triaxial electromagnetic Hopkinson bar system according to still another embodiment of the present disclosure.
Figure 15:
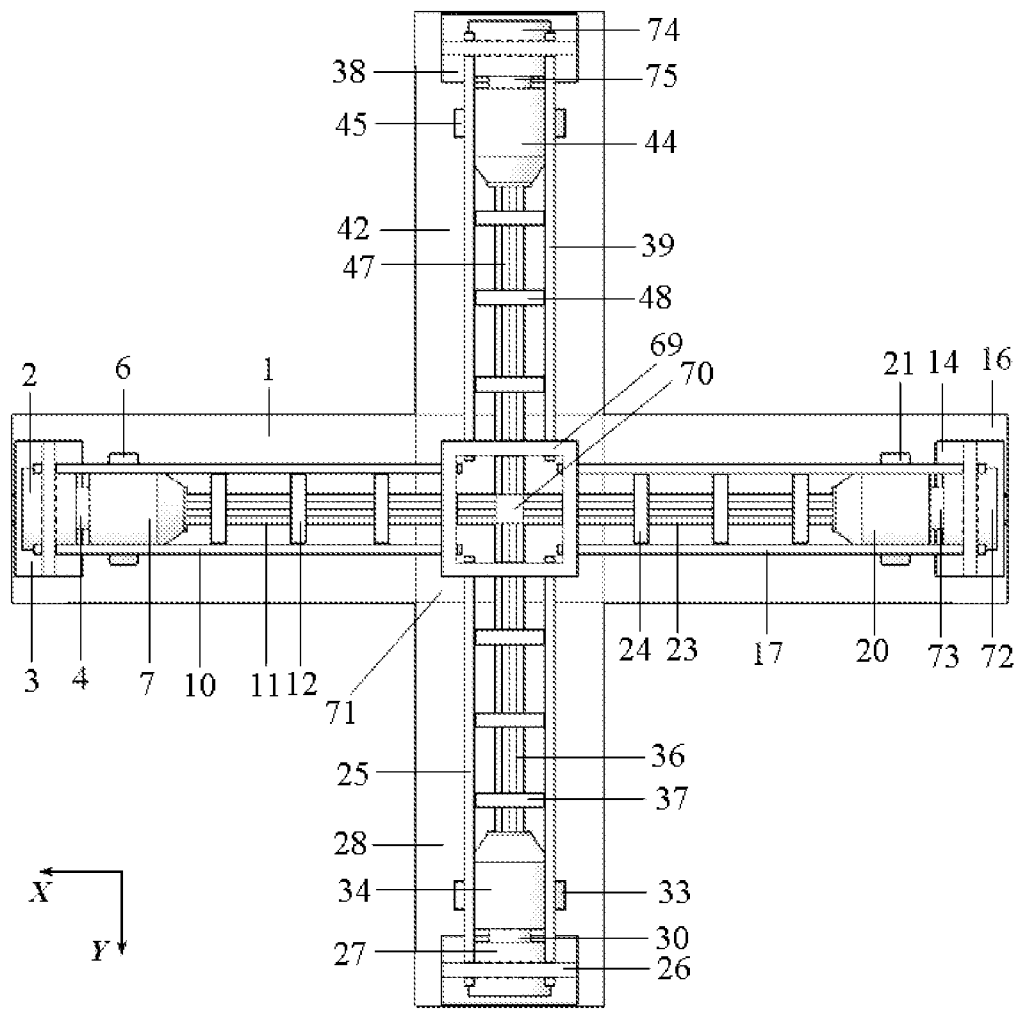
FIG. 15 is a vertical view of the dynamic true triaxial electromagnetic Hopkinson bar system according to still another embodiment of the present disclosure.

Further, the large-size square bar consists of a bundle of small-size bars; the bundle of small-size bars are bound by the square bar fixation and support frame to form the large-size square bar; a 1 mm-2 mm gap is reserved between the single bars; resistance strain gauges are adhered on each single bar; the square bars in various directions have the same cross section and length, and have the same internal dynamic stress wave propagation behavior and dynamic response signal monitoring mode; that is, the square bar is a bar bundle. FIG. 14 is a three-dimensional view of the large-size square bar in the dynamic true triaxial electromagnetic Hopkinson bar system. The test apparatus is placed on the horizontal cruciform support platform; the platform consists of a support platform in the direction $X_+$ 1, a support platform in the direction $X_-$ 16, a support platform in the direction $Y_+$ 28, a support platform in the direction $Y_-$ 42, and a central support platform 71. The upper surface (in the direction $Z_+$) of the central cubic box 69 completely opens; a square opening is disposed in the center of the central cubic box 69 in each direction of $X_+$, $X_-$, $Y_+$, $Y_-$, and $Z_-$, respectively; the size of the square openings is the same as that of the square bars; the central cubic box 69 is disposed in the center of the upper surface of the central support platform 71; the central cubic box and the horizontal cruciform support platform form an orthogonal coordinate system for precisely positioning and centering the triaxial and six-directional square bar system. The confining-pressure loading systems, the annular electromagnetic pulse generators, the square bars, and the self-lubricating square bar fixation and support frames in the directions $X_+$, $X_-$, $Y_+$, $Y_-$, $Z_+$, and $Z_-$ are respectively symmetrically arranged by taking the central cubic box 69 as a symmetric center, so as to construct a triaxial and six-directional Hopkinson square bar system. The Hopkinson bar in the direction $X_+$ consists of a confining-pressure loading and fixing end baffle in the direction $X_+$ 3, a confining-pressure loading hydraulic cylinder in the direction $X_+$ 2, a confining-pressure loading actuator in the direction $X_+$ 4, an electromagnetic pulse generator in the direction $X_+$ 7, a link support bar in the direction $X_+$ 10, a square bar in the direction $X_+$ 11, a self-lubricating square bar fixation and support frame in the direction $X_+$ 12, an electromagnetic pulse generator support frame in the direction $X_+$ 6, and a square bar centering and positioning guide rail in the direction $X_+$ 13, wherein the square bar in the direction $X_+$ 11 is fixed by the self-lubricating square bar fixation and support frame in the direction $X_+$ 12; the square bar in the direction $X_+$ and the central cubic box 69 are centered and connected at the square opening in the direction $X_+$ along the square bar centering and positioning guide rail in the direction $X_+$ 13; the confining-pressure loading hydraulic cylinder in the direction $X_+$ 2, the confining-pressure loading actuator in the direction $X_+$ 4, and the electromagnetic pulse generator in the direction $X_+$ 7 are combined in series (as shown in FIG. 15), which are placed at the incident end of the square bar in the direction $X_+$ 11, and are used to apply a static confining pressure and a dynamic stress pulse load in the direction $X_+$ to the test specimen along the incident end of the square bar in the direction $X_+$ 11; the link support bar in the direction $X_+$ 10 connects the confining-pressure loading and fixing end baffle in the direction $X_+$ 3 to the central cubic box 69, so as to provide a frame fixation and counterforce support system for applying the static confining pressure in the direction $X_+$. The square bar in the direction $X_-$ 23 is fixed by the self-lubricating square bar fixation and support frame in the direction $X_-$ 24; the square bar in the direction $X_-$ and the central cubic box 69 are centered and connected at the square opening in the direction $X_-$ along the square bar centering and positioning guide rail in the direction $X_-$ 15; the confining-pressure loading hydraulic cylinder in the direction $X_-$ 72, the confining-pressure loading actuator in the direction $X_-$ 73, and the electromagnetic pulse generator in the direction $X_-$ 20 are combined in series, which are placed at the incident end of the square bar in the direction $X_-$ 23, and are used to apply a static confining pressure and a dynamic stress pulse load in the direction $X_-$ to the test specimen along the incident end of the square bar in the direction $X_-$ 23; the link support bar in the direction $X_-$ 17 connects the confining-pressure loading and fixing end baffle in the direction $X_-$ 14 to the central cubic box 69, so as to provide a frame fixation and counterforce support system for applying the static confining pressure in the direction $X_-$. The square bar in the direction $Y_+$ 36 is fixed by the self-lubricating square bar fixation and support frame in the direction $Y_+$ 37; the square bar in the direction $Y_+$ 36 and the central cubic box 69 are centered and connected at the square opening in the direction $Y_+$ along the square bar centering and positioning guide rail in the direction $Y_+$ 29; the confining-pressure loading hydraulic cylinder in the direction $Y_+$ 27, the confining-pressure loading actuator in the direction $Y_+$ 30, and the electromagnetic pulse generator in the direction $Y_+$ 34 are combined in series, which are placed at the incident end of the square bar in the direction $Y_+$ 36, and are used to apply a static confining pressure and a dynamic stress pulse load in the direction $Y_+$ to the test specimen along the incident end of the square bar in the direction $Y_+$ 36; the link support bar in the direction $Y_+$ 25 connects the confining-pressure loading and fixing end baffle in the direction $Y_+$ 26 to the central cubic box 69, so as to provide a frame fixation and counterforce support system for applying the static confining pressure in the direction $Y_+$. The square bar in the direction $Y_-$ 47 is fixed by the self-lubricating square bar fixation and support frame in the direction $Y_-$ 48; the square bar in the direction $Y_-$ and the central cubic box 69 are centered and connected at the square opening in the direction $Y_-$ along the square bar centering and positioning guide rail in the direction $Y_-$ 41; the confining-pressure loading hydraulic cylinder in the direction $Y_-$ 74, the confining-pressure loading actuator in the direction $Y_-$ 75, and the electromagnetic pulse generator in the direction $Y_-$ 44 are combined in series, which are placed at the incident end of the square bar in the direction $Y_-$ 47, and are used to apply a static confining pressure and a dynamic stress pulse load in the direction $Y_-$ to the test specimen along the incident end of the square bar in the direction $Y_-$ 47; the link support bar in the direction $Y_-$ 39 connects the confining-pressure loading and fixing end baffle in the direction $Y_-$ 38 to the central cubic box 69, so as to provide a frame fixation and counterforce support system for applying the static confining pressure in the direction $Y_-$. The square bar in the direction $Z_+$ 59 is fixed by the self-lubricating square bar fixation and support frame in the direction $Z_+$ 58; the square bar in the direction $Z_+$ 59 and the central cubic box 69 are centered and connected at the square opening in the direction $Z_+$ along the square bar centering and positioning guide rail in the direction $Z_+$ 57; the confining-pressure loading hydraulic cylinder in the direction $Z_+$ 49, the confining-pressure loading actuator in the direction $Z_+$ 50, and the electromagnetic pulse generator in the direction $Z_+$ 55 are combined in series, which are placed at the incident end of the square bar in the direction $Z_+$ 59, and are used to apply a static confining pressure and a dynamic stress pulse load in the direction $Z_+$ to a test specimen along the incident end of the square bar in the direction $Z_+$ 59; the vertical fixation and support frame in the direction $Z_+$ 52 is connected to the central cubic box 69 to provide a frame fixation and counterforce support system for applying the static confining pressure in the direction $Z_+$. The square bar in the direction $Z_-$ 63 is fixed by the self-lubricating square bar fixation and support frame in the direction $Z_-$ 60; the square bar in the direction $Z_-$ 63 and the central cubic box 69 are centered and connected at the square opening in the direction $Z_-$ along the square bar centering and positioning guide rail in the direction $Z_-$ 62; the confining-pressure loading hydraulic cylinder in the direction $Z_-$ 77, the confining-pressure loading actuator in the direction $Z_-$ 78, and the electromagnetic pulse generator in the direction $Z_-$ 67 are combined in series, which are placed at the incident end of the square bar in the direction $Z_-$ 63, and are used to apply a static confining pressure and a dynamic stress pulse load in the direction $Z_-$ to the test specimen along the incident end of the square bar in the direction $Z_-$ 63; the vertical fixation and support frame in the direction $Z_-$ 65 is connected to the central cubic box 69 to provide a frame fixation and counterforce support system for applying the static confining pressure in the direction $Z_-$.

Figure 16:
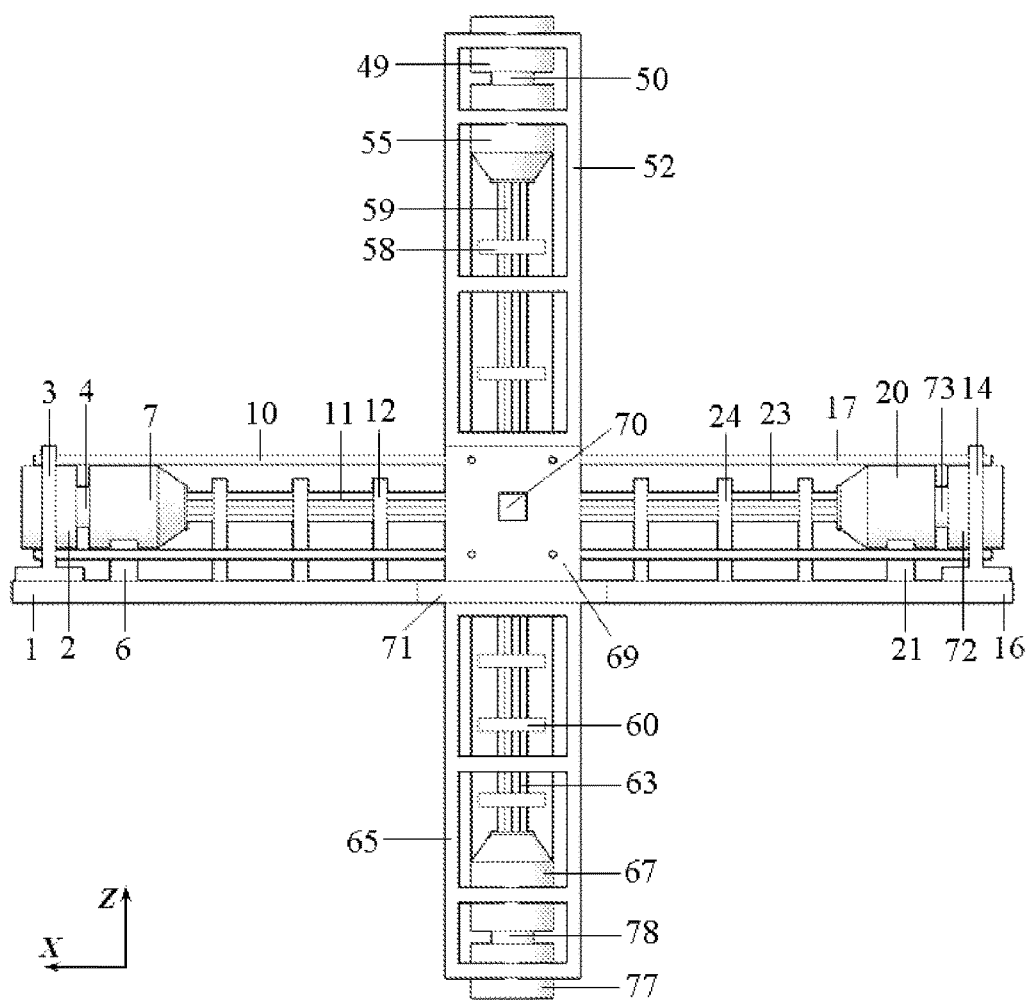
FIG. 16 is a front view of the dynamic true triaxial electromagnetic Hopkinson bar system according to still another embodiment of the present disclosure.
Figure 17:
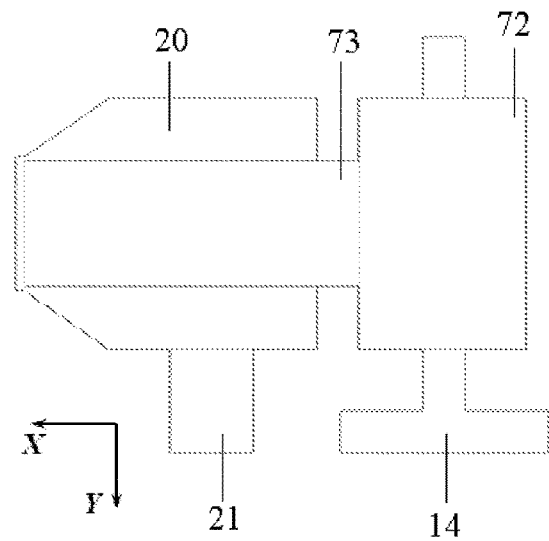
FIG. 17 is a front view (middle section) how a confining-pressure loading hydraulic cylinder, a confining-pressure loading actuator and an annular electromagnetic pulse generator in the direction $X_-$ of the dynamic true triaxial electromagnetic Hopkinson bar system according to another embodiment of the present disclosure are assembled and mounted.

FIG. 17 is a front view (section view) how the confining-pressure loading hydraulic cylinder in the direction $X_-$ 72, the confining-pressure loading actuator in the direction $X_-$ 73, and the electromagnetic pulse generator in the direction $X_-$ 20 of the dynamic true triaxial electromagnetic Hopkinson bar system with large-size square bar bundle are assembled and mounted. The confining-pressure loading hydraulic cylinder in the direction $X_-$ 72 and the confining-pressure loading actuator in the direction $X_-$ 73 form a confining-pressure hydraulic loading system, and are fixed on the confining-pressure loading and fixing end baffle in the direction $X_-$ 14; the electromagnetic pulse generator in the direction $X_-$ 20 is placed on the electromagnetic pulse generator support frame in the direction $X_-$ 21; the confining-pressure loading actuator in the direction $X_-$ 73 extends into the electromagnetic pulse generator in the direction $X_-$ 20 along an annular opening on the right side, and attached to the circular end surface at the left end of the electromagnetic pulse generator in the direction $X_-$ 20; during testing, the confining-pressure loading hydraulic cylinder in the direction $X_-$ 72 and the confining-pressure loading actuator in the direction $X_-$ 73 apply a static confining pressure in the direction $X_-$ to the incident end of the square bar in the direction $X_-$ 23 (as shown in FIG. 14) by means of the circular end surface at the left end of the electromagnetic pulse generator in the direction $X_-$ 20; the electromagnetic pulse generator in the direction $X_-$ 20 inputs and propagates, by means of the circular end surface at the left end, a dynamic stress pulse load into the cubic test specimen 70 along the incident end of the square bar in the direction $X_-$ 23 (as shown in FIGS. 14-16), so as to apply a dynamic load in the direction $X_-$ to the test specimen.

The present disclosure is described in detail above with reference to specific preferred embodiments. However, the specific embodiments of the present disclosure are not considered to be limited by the descriptions only. For a person skilled in the art, any simple deductions or substitutions made without departing from the concept of the present disclosure should be all concluded in the protection scope of the present disclosure.

What is claimed is:

1. A method for using a dynamic true triaxial electromagnetic Hopkinson bar system to implement dynamic damage of solid materials and ultrasonic wave propagation tests, comprising the following test steps:

step 1, before a static prestress and an impact load are applied, placing an ultrasonic probe at an incident end of each square bar in six directions; in the direction $X_+$, the ultrasonic probe is an ultrasonic transmitter probe which emits an ultrasonic incident signal, wherein the ultrasonic signal propagates along the square bar in the direction $X_+$, passes through a cubic test specimen, and then continuously propagates to the square bar in the direction $X_-$ as a transmitted ultrasonic signal, which is finally received by an ultrasonic receiver probe placed at the incident end of the square bar in the direction $X_-$; recording and storing a complete ultrasonic signal in the direction X without application of the static prestress and the impact load; in the direction Y, utilizing an ultrasonic transmitter probe placed at the incident end of the square bar in the direction $Y_+$ to emit an ultrasonic incident signal, wherein the ultrasonic signal propagates along the square bar in the direction $Y_+$, passes through the cubic test specimen, and then continuously propagates to the square bar in the direction $Y_-$ as a transmitted ultrasonic signal, which is finally received by an ultrasonic receiver probe placed at the incident end of the square bar in the direction $Y_-$; recording and storing a complete ultrasonic signal in the direction Y without application of the static prestress and the impact load; in the direction Z, utilizing an ultrasonic transmitter probe placed at the incident end of the square bar in the direction $Z_+$ to emit an ultrasonic incident signal, wherein the ultrasonic signal propagates along the square bar in the direction $Z_+$, passes through the cubic test specimen, and then continuously propagates to the square bar in the direction $Z_-$ as a transmitted ultrasonic signal, which is finally received by an ultrasonic receiver probe placed at the incident end of the square bar in the direction $Z_-$; recording and storing a complete ultrasonic signal in the direction Z without application of the static prestress and the impact load;

step 2, applying the static prestress, wherein a mode of applying the static prestress is provided by taking the direction X as an example: opening a high pressure oil pipe, filling a confining-pressure loading hydraulic cylinder in the direction $X_+$ with oil by means of an oil inlet, and pushing a confining-pressure loading actuator in the direction $X_+$ to move forward and contact a confining-pressure loading frame in the direction $X_+$; continuously applying an oil pressure to push the confining-pressure loading actuator in the direction $X_+$ to move forward and then transfers an axial pressure to the square bar in the direction $X_+$ by means of a circular bulge in the direction $X_+$, and then loading the axial pressure on the cubic test specimen, so that the cubic test specimen is under a precise static prestress in the direction X; similarly, the static confining-pressure loading principle in the directions Y and Z is the same as that in the direction X;

step 3, under the action of the static prestress in the step 2, re-utilizing the ultrasonic transmitter probe placed at the incident end of the square bar in the direction $X_+$ to emit an ultrasonic incident signal, and utilizing the ultrasonic receiver probe placed at the incident end of the square bar in the direction $X_-$ to receive the transmitted ultrasonic signal passing through the test specimen loaded with static prestress, recording and storing a complete ultrasonic signal in the direction X under the static prestress; in the direction Y, utilizing the ultrasonic transmitter probe placed at the incident end of the square bar in the direction $Y_+$ to emit an ultrasonic incident signal, and utilizing the ultrasonic receiving probe placed at the incident end of the square bar in the direction $Y_-$ to receive the transmitted ultrasonic signal passing through the test specimen loaded with static prestress, recording and storing a complete ultrasonic signal in the direction Y under the static prestress; in the direction Z, utilizing the ultrasonic transmitter probe placed at the incident end of the square bar in the direction $Z_+$ to emit an ultrasonic incident signal, utilizing the ultrasonic receiver probe placed at the incident end of the square bar in the direction $Z_-$ to receive the transmitted ultrasonic signal passing through the test specimen loaded with static prestress, recording and storing a complete ultrasonic signal in the direction Z under the static prestress;

step 4, applying the impact load, wherein a mode of applying the impact load is provided by taking the direction X as an example: after the step 3 is completed, moving the ultrasonic transmitter probe and the ultrasonic receiver probe closely attached to the incident end of the square bars in the directions $X_+$ and $X_-$, respectively, then, placing an electromagnetic pulse generator in the direction $X_+$ and an electromagnetic pulse generator support frame in the direction $X_+$ at the incident end of the square bar in the direction $X_+$ in the confining-pressure loading frame in the direction $X_+$, wherein the electromagnetic pulse generator in the direction $X_+$ is freely and closely attached to the incident end of the square bar in the direction $X_+$, and is used to apply a dynamic stress pulse load in the direction $X_+$ to the test specimen along the incident end of the square bar in the direction $X_+$; and placing an electromagnetic pulse generator in the direction $X_-$ and an electromagnetic pulse generator support frame in the direction $X_-$ at the incident end of the square bar in the direction $X_-$ in the confining-pressure loading frame in the direction $X_-$, wherein the electromagnetic pulse generator in the direction $X_-$ is freely and closely attached to the incident end of the square bar in the direction $X_-$, and is used to apply a dynamic stress pulse load in the direction $X_-$ to the test specimen along the incident end of the square bar in the direction $X_-$; similarly, after the same operations as those in the direction X are performed in the directions Y and Z, then utilizing a triaxial and six-directional synchronous-coordinated-control electromagnetic loading system to apply dynamic impact loads to the test specimen along the directions X, Y and Z; and step 5, after completing dynamic impact loading test, continuously remaining the static prestress in the directions X, Y, and Z unchanged, namely, not releasing the static prestress, then removing the electromagnetic pulse generator in the direction $X_+$ and the electromagnetic pulse generator support frame in the direction $X_+$, and placing the ultrasonic transmitter probe at the incident end of the square bar in the direction $X_+$ in the confining-pressure loading frame in the direction $X_+$, wherein the ultrasonic transmitter probe is freely and closely attached to the incident end of the square bar in the direction $X_+$; similarly, after performing the same operations as those in the direction $X_+$ in the directions $X_-$, $Y_+$, $Y_-$, $Z_+$, and $Z_-$, all the electromagnetic pulse generators and the electromagnetic pulse generator support frames are removed away, and enabling the ultrasonic transmitter probes and the ultrasonic receiver probes to be freely and closely attached to the incident ends of the square bars, respectively; subsequently, under a state that the static prestress is not released, utilizing the ultrasonic transmitter probe placed at the incident end of the square bar in the direction $X_+$ to emit an ultrasonic incident signal, utilizing the ultrasonic receiver probe placed at the incident end of the square bar in the direction $X_-$ to receive the transmitted ultrasonic signal passing through the impact loaded test specimen from the direction X, recording and storing a complete ultrasonic signal in the direction X after application of the static prestress and the dynamic impact load, respectively; in the direction Y, utilizing the ultrasonic transmitter probe placed at the incident end of the square bar in the direction $Y_+$ to emit an ultrasonic incident signal, utilizing the ultrasonic receiver probe placed at the incident end of the square bar in the direction $Y_-$ to receive the transmitted ultrasonic signal passing through the impact loaded test specimen from the direction Y, recording and storing a complete ultrasonic signal in the direction Y after application of the static prestress and the dynamic impact load, respectively; in the direction Z, utilizing the ultrasonic transmitter probe placed at the incident end of the square bar in the direction $Z_+$ to emit an ultrasonic incident signal, utilizing the ultrasonic receiver probe placed at the incident end of the square bar in the direction $Z_-$ to receive the transmitted ultrasonic signal passing through the impact loaded test specimen from the direction Z, recording and storing a complete ultrasonic signal in the direction Z after application of the static prestress and the dynamic impact load, respectively.

2. The method for using the dynamic true triaxial electromagnetic Hopkinson bar system to perform dynamic damage of solid materials and ultrasonic wave propagation tests according to claim 1, wherein in the step 2, the static prestresses are synchronously controlled and loaded in the directions X, Y, and Z by means of a servo controlled static confining-pressure loading system, and load amplitudes of static confining pressures can be flexibly set in the directions X, Y, and Z respectively according to test requirements.

3. The method for using the dynamic true triaxial electromagnetic Hopkinson bar system to perform dynamic damage of solid materials and ultrasonic wave propagation tests according to claim 1, wherein in the step 4, the dynamic impact loads are synchronously or asynchronous controlled and loaded in the directions X, Y, and Z by means of the triaxial and six-directional synchronous-coordinated-control electromagnetic loading system, and load amplitudes of the dynamic impact loads can be flexibly set in the directions X, Y, and Z respective according to test requirements.

4. The method for using the dynamic true triaxial electromagnetic Hopkinson bar system to perform dynamic damage of solid materials and ultrasonic wave propagation tests according to claim 1, wherein static confining pressure in the direction $X_+$ and static confining pressure in the direction $X_-$ are an action and a reaction which are equal in magnitude and opposite in direction; static confining pressure in the direction $Y_+$ and static confining pressure in the direction $Y_-$ are an action and a reaction which are equal in magnitude and opposite in direction; and static confining pressure in the direction $Z_+$ and static confining pressure in the direction $Z_-$ are an action and a reaction which are equal in magnitude and opposite in direction.

5. A dynamic true triaxial electromagnetic Hopkinson bar system, comprising a horizontal cruciform support platform, a central cubic box, square bars, and square bar fixation and support frames, wherein the horizontal cruciform support platform comprises a support platform in the direction $X_+$, a support platform in the direction $X_-$, a support platform in the direction $Y_+$, a support platform in the direction $Y_-$, and a central support platform; an upper surface of the central cubic box completely opens; the direction of the upper surface of the central cubic box is the direction $Z_+$; a square opening is disposed in the center of the central cubic box in each direction of $X_+$, $X_-$, $Y_+$, $Y_-$, and $Z_-$, respectively; the size of the square openings is the same as that of the square bars; the central cubic box is disposed in the center of an upper surface of the central support platform; the central cubic box and the horizontal cruciform support platform form an orthogonal coordinate system; confining-pressure loading systems, electromagnetic pulse generators, the square bars, and self-lubricating square bar fixation and support frames in the directions $X_+$, $X_-$, $Y_+$, $Y_-$, $Z_+$, and $Z_-$ are respectively symmetrically arranged by taking the central cubic box as a symmetric center, so as to construct the dynamic true triaxial electromagnetic Hopkinson bar system; the square bars in the directions X and Y are all horizontally placed, and the square bars in the direction Z are vertically placed.

6. The dynamic true triaxial electromagnetic Hopkinson bar system according to claim 5, wherein the confining-pressure loading system comprises a confining-pressure loading hydraulic cylinder, a confining-pressure loading actuator, and a confining-pressure loading frame; the confining-pressure loading frames in the directions $X_+$, $X_-$, $Y_+$, $Y_-$, $Z_+$, and $Z_-$ are respectively symmetrically arranged by taking the central cubic box as a symmetric center; the confining-pressure loading hydraulic cylinder and the confining-pressure loading actuator are arranged in one of directions $X_+$ and $X_-$; the confining-pressure loading hydraulic cylinder and the confining-pressure loading actuator are arranged in one of directions $Y_+$ and $Y_-$; and the confining-pressure loading hydraulic cylinder and the confining-pressure loading actuator are arranged in one of directions $Z_+$ and $Z_-$.

7. The dynamic true triaxial electromagnetic Hopkinson bar system according to claim 6, wherein a circular bulge is disposed on one side of each square bar adjacent to a loading end of an incident stress wave; the confining-pressure loading hydraulic cylinder, the confining-pressure loading actuator, and the confining-pressure loading frame are combined in series; and the confining-pressure loading frame is connected to the circular bulge in series, and is used to transfer the pressure from the confining-pressure loading hydraulic cylinder to the square bars and the test specimen.

8. The dynamic true triaxial electromagnetic Hopkinson bar system according to claim 7, wherein the true triaxial electromagnetic Hopkinson bar system further comprises a temperature control system; the temperature control system comprises a temperature control apparatus; the temperature control apparatus comprises a temperature control cabinet; a heating hole is built in the temperature control cabinet; heating rods with lead wires are placed in the heating holes; the volume of a hearth of the temperature control cabinet is 1.5-2.5 times that of the test specimen; a square hole is respectively reserved on each surface of the temperature control cabinet; the size of the square holes on the six surfaces of the temperature control cabinet is consistent with the size of a cross section of the square bar of the Hopkinson bar; and the temperature control cabinet is designed to have four symmetric parts.

9. The dynamic true triaxial electromagnetic Hopkinson bar system according to claim 8, wherein the distance from the circular bulge to the loading end of the incident stress wave of the square bar is 3%-7% of the length of the square bar.

10. The dynamic true triaxial electromagnetic Hopkinson bar system according to claim 8, wherein the length of the circular bulge is 1.5%-4% of the length of the square bar.

11. The dynamic true triaxial electromagnetic Hopkinson bar system according to claim 8, wherein the diameter of the circular bulge is 1.5-2.5 times the side length of a cross section of the square bar.

12. The dynamic true triaxial electromagnetic Hopkinson bar system according to claim 5, wherein the electromagnetic pulse generator is an annular electromagnetic pulse generator; the square bars in the directions X and Y are all horizontally placed, and the square bars in the direction Z are vertically placed; the side length of the cross section of the square bar is greater than or equal to 100 mm; the square bar is formed by symmetrically binding a bundle of square single bars with a side length of the cross section less than or equal to 50 mm by means of the square bar fixation and support frames; a 1 mm-2 mm gap is reserved between the single bars; resistance strain gauges are adhered on each single bar; the cross sections and lengths of the square bars in all directions in the triaxial and six-directional square bar system are all equal, and the internal dynamic stress wave propagation behavior and monitoring of the dynamic response signal in the square bars are all the same.

13. The dynamic true triaxial electromagnetic Hopkinson bar system according to claim 12, wherein a dynamic true triaxial electromagnetic Hopkinson bar test system in the direction $X_+$ comprises a confining-pressure loading and fixing end baffle in the direction $X_+$, a confining-pressure loading hydraulic cylinder in the direction $X_+$, a confining-pressure loading actuator in the direction $X_+$, an annular electromagnetic pulse generator in the direction $X_+$, a link support bar in the direction $X_+$, a square bar in the direction $X_+$, a self-lubricating square bar fixation and support frame in the direction $X_+$, an annular electromagnetic pulse generator support frame in the direction $X_+$, and a square bar centering and positioning guide rail in the direction $X_+$, wherein the square bar in the direction $X_+$ is fixed by the self-lubricating square bar fixation and support frame in the direction $X_+$; the square bar in the direction $X_+$ and the central cubic box are centered and connected at the square opening in the direction $X_+$ along the square bar centering and positioning guide rail in the direction $X_+$; the confining-pressure loading hydraulic cylinder in the direction $X_+$, the confining-pressure loading actuator in the direction $X_+$, and the annular electromagnetic pulse generator in the direction $X_+$ are combined in series, which are placed at the incident end of the square bar in the direction $X_+$, and are used to apply a static confining pressure and a dynamic stress pulse load in the direction $X_+$ to a test specimen along the incident end of the square bar in the direction $X_+$; the link support bar in the direction $X_+$ connects the confining-pressure loading and fixing end baffle in the direction $X_+$ to the central cubic box, so as to provide a frame fixation and counterforce support system for applying the static confining pressure in the direction $X_+$.

14. The dynamic true triaxial electromagnetic Hopkinson bar system according to claim 12, wherein a dynamic true triaxial electromagnetic Hopkinson bar test system in the direction $X_-$ comprises a confining-pressure loading and fixing end baffle in the direction $X_-$, a confining-pressure loading hydraulic cylinder in the direction $X_-$, a confining-pressure loading actuator in the direction $X_-$, an annular electromagnetic pulse generator in the direction $X_-$, an annular electromagnetic pulse generator support frame in the direction $X_-$, a support platform in the direction $X_-$, a link support bar in the direction $X_-$, a square bar in the direction $X_-$, a self-lubricating square bar fixation and support frame in the direction $X_-$, and a square bar centering and positioning guide rail in the direction $X_-$, wherein the square bar in the direction $X_-$ is fixed by the self-lubricating square bar fixation and support frame in the direction $X_-$; the square bar in the direction $X_-$ and the central cubic box are centered and connected at the square opening in the direction $X_-$ along the square bar centering and positioning guide rail in the direction $X_-$; the confining-pressure loading hydraulic cylinder in the direction $X_-$, the confining-pressure loading actuator in the direction $X_-$, and the annular electromagnetic pulse generator in the direction $X_-$ are combined in series, which are placed at the incident end of the square bar in the direction $X_-$, and are used to apply a static confining pressure and a dynamic stress pulse load in the direction $X_-$ to a test specimen along the incident end of the square bar in the direction $X_-$; the link support bar in the direction $X_-$ connects the confining-pressure loading and fixing end baffle in the direction $X_-$ to the central cubic box, so as to provide a frame fixation and counterforce support system for applying the static confining pressure in the direction $X_-$.

15. The dynamic true triaxial electromagnetic Hopkinson bar system according to claim 12, wherein a dynamic true triaxial electromagnetic Hopkinson bar test system in the direction $Y_+$ comprises a support platform in the direction $Y_+$, a confining-pressure loading hydraulic cylinder in the direction $Y_+$, a confining-pressure loading and fixing end baffle in the direction $Y_+$, a confining-pressure loading actuator in the direction $Y_+$, an annular electromagnetic pulse generator support frame in the direction $Y_+$, an annular electromagnetic pulse generator in the direction $Y_+$, a link support bar in the direction $Y_+$, a self-lubricating square bar fixation and support frame in the direction $Y_+$, a square bar in the direction $Y_+$, and a square bar centering and positioning guide rail in the direction $Y_+$, wherein the square bar in the direction $Y_+$ is fixed by the self-lubricating square bar fixation and support frame in the direction $Y_+$; the square bar in the direction $Y_+$ and the central cubic box are centered and connected at the square opening in the direction $Y_+$ along the square bar centering and positioning guide rail in the direction $Y_+$; the confining-pressure loading hydraulic cylinder in the direction $Y_+$, the confining-pressure loading actuator in the direction $Y_+$, and the annular electromagnetic pulse generator in the direction $Y_+$ are combined in series, which are placed at the incident end of the square bar in the direction $Y_+$, and are used to apply a static confining pressure and a dynamic stress pulse load in the direction $Y_+$ to a test specimen along the incident end of the square bar in the direction $Y_+$; the link support bar in the direction $Y_+$ connects the confining-pressure loading and fixing end baffle in the direction $Y_+$ to the central cubic box, so as to provide a frame fixation and counterforce support system for applying the static confining pressure in the direction $Y_+$.

16. The dynamic true triaxial electromagnetic Hopkinson bar system according to claim 12, wherein a dynamic true triaxial electromagnetic Hopkinson bar test system in the direction $Y_-$ comprises a support platform in the direction $Y_-$, a confining-pressure loading and fixing end baffle in the direction $Y_-$, a confining-pressure loading hydraulic cylinder in the direction $Y_-$, a confining-pressure loading actuator in the direction $Y_-$, an annular electromagnetic pulse generator in the direction Y, an annular electromagnetic pulse generator support frame in the direction $Y_-$, a link support bar in the direction $Y_-$, a square bar in the direction $Y_-$, a self-lubricating square bar fixation and support frame in the direction $Y_-$, and a square bar centering and positioning guide rail in the direction $Y_-$, wherein the square bar in the direction $Y_-$ is fixed by the self-lubricating square bar fixation and support frame in the direction $Y_-$; the square bar in the direction $Y_-$ and the central cubic box are centered and connected at the square opening in the direction $Y_-$ along the square bar centering and positioning guide rail in the direction $Y_-$; the confining-pressure loading hydraulic cylinder in the direction $Y_-$, the confining-pressure loading actuator in the direction $Y_-$, and the annular electromagnetic pulse generator in the direction $Y_-$ are combined in series, which are placed at the incident end of the square bar in the direction $Y_-$, and are used to apply a static confining pressure and a dynamic stress pulse load in the direction $Y_-$ to a test specimen along the incident end of the square bar in the direction $Y_-$; the link support bar in the direction $Y_-$ connects the confining-pressure loading and fixing end baffle in the direction $Y_-$ to the central cubic box, so as to provide a frame fixation and counterforce support system for applying the static confining pressure in the direction $Y_-$.

17. The dynamic true triaxial electromagnetic Hopkinson bar system according to claim 12, wherein a dynamic true triaxial electromagnetic Hopkinson bar test system in the direction $Z_+$ comprises a confining-pressure loading hydraulic cylinder in the direction $Z_+$, a confining-pressure loading and fixing end baffle in the direction $Z_+$, a vertical fixation and support frame in the direction $Z_+$, a confining-pressure loading actuator in the direction $Z_+$, an annular electromagnetic pulse generator in the direction $Z_+$, an annular electromagnetic pulse generator support frame in the direction $Z_+$, a square bar centering and positioning guide rail in the direction $Z_+$, a square bar in the direction $Z_+$, and a self-lubricating square bar fixation and support frame in the direction $Z_+$, wherein the square bar in the direction $Z_+$ is fixed by the self-lubricating square bar fixation and support frame in the direction $Z_+$; the square bar in the direction $Z_+$ and the central cubic box are centered and connected at the square opening in the direction $Z_+$ along the square bar centering and positioning guide rail in the direction $Z_+$; the confining-pressure loading hydraulic cylinder in the direction $Z_+$, the confining-pressure loading actuator in the direction $Z_+$, and the annular electromagnetic pulse generator in the direction $Z_+$ are combined in series, which are placed at the incident end of the square bar in the direction $Z_+$, and are used to apply a static confining pressure and a dynamic stress pulse load in the direction $Z_+$ to a test specimen along the incident end of the square bar in the direction $Z_+$; the vertical fixation and support frame in the direction $Z_+$ is connected to the central cubic box to provide a frame fixation and counterforce support system for applying the static confining pressure in the direction $Z_+$.

18. The dynamic true triaxial electromagnetic Hopkinson bar system according to claim 12, wherein a dynamic true triaxial electromagnetic Hopkinson bar test system in the direction $Z_-$ comprises a vertical fixation and support frame in the direction $Z_-$, an annular electromagnetic pulse generator in the direction $Z_-$, an annular electromagnetic pulse generator support frame in the direction $Z_-$, a confining-pressure loading hydraulic cylinder in the direction $Z_-$, a confining-pressure loading actuator in the direction $Z$, a confining-pressure loading end bracket in the direction $Z_-$, a square bar centering and positioning guide rail in the direction $Z_-$, a square bar in the direction $Z_-$, and a self-lubricating square bar fixation and support frame in the direction $Z_-$, wherein the square bar in the direction $Z_-$ is fixed by the self-lubricating square bar fixation and support frame in the direction $Z_-$; the square bar in the direction $Z_-$ and the central cubic box are centered and connected at the square opening in the direction $Z_-$ along the square bar centering and positioning guide rail in the direction $Z_-$; the confining-pressure loading hydraulic cylinder in the direction $Z_-$, the confining-pressure loading actuator in the direction $Z_-$, and the annular electromagnetic pulse generator in the direction $Z_-$ are combined in series, which are placed at the incident end of the square bar in the direction $Z_-$, and are used to apply a static confining pressure and a dynamic stress pulse load in the direction $Z_-$ to a test specimen along the incident end of the square bar in the direction $Z_-$; the vertical fixation and support frame in the direction $Z_-$ is connected to the central cubic box to provide a frame fixation and counterforce support system for applying the static confining pressure in the direction $Z_-$.

\* \* \* \* \*